United States Patent
Brown et al.

(10) Patent No.: US 12,519,648 B2
(45) Date of Patent: Jan. 6, 2026

(54) SYSTEMS AND DEVICES CONFIGURED TO GENERATE AND UTILIZE SHORT-RANGE COMMUNICATION-BASED AUTHENTICATION TOKENS, AND METHODS OF USE THEREOF

(71) Applicant: Capital One Services, LLC, McLean, VA (US)

(72) Inventors: Kelly Jo Brown, Rockville, MD (US); Emily Wallar, Woodbridge, VA (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 180 days.

(21) Appl. No.: 18/408,324

(22) Filed: Jan. 9, 2024

(65) Prior Publication Data

US 2025/0226987 A1    Jul. 10, 2025

(51) Int. Cl.
*H04L 9/32* (2006.01)

(52) U.S. Cl.
CPC .......... *H04L 9/3236* (2013.01); *H04L 9/3213* (2013.01)

(58) Field of Classification Search
CPC ............................ H04L 9/3236; H04L 9/3213
See application file for complete search history.

(56) References Cited

U.S. PATENT DOCUMENTS

| | | | |
|---|---|---|---|
| 7,103,771 B2 * | 9/2006 | Grawrock | G06F 21/57 726/9 |
| 8,090,939 B2 * | 1/2012 | Ali | G06F 21/34 713/156 |
| 9,503,260 B2 | 11/2016 | Brands | |
| 10,063,381 B2 | 8/2018 | Lee | |
| 2013/0152185 A1 | 6/2013 | Singh et al. | |
| 2017/0093536 A1 | 3/2017 | Yoganathan et al. | |
| 2017/0359332 A1 | 12/2017 | Hanay et al. | |
| 2020/0100108 A1 * | 3/2020 | Everson | H04W 12/041 |
| 2021/0036856 A1 | 2/2021 | Wang et al. | |
| 2022/0368528 A1 | 11/2022 | Vennapusa et al. | |
| 2024/0039714 A1 * | 2/2024 | Benson | H04L 9/3263 |

FOREIGN PATENT DOCUMENTS

| | | | | |
|---|---|---|---|---|
| KR | 20180080655 A | * | 7/2018 | ........... H04L 9/3249 |
| WO | WO-2023172261 A1 | * | 9/2023 | ........... H04L 9/0825 |

OTHER PUBLICATIONS

International Search Report and Written Opinion from International Application No. PCT/US2025/010686 dated Mar. 7, 2025.

* cited by examiner

*Primary Examiner* — Luu T Pham
*Assistant Examiner* — Paul J Skwierawski
(74) *Attorney, Agent, or Firm* — Greenberg Traurig, LLP

(57) ABSTRACT

Systems and methods of the present disclosure enable improved cryptographic security using an integrated circuit of a short range wireless card. The integrated circuit receives, via a short range wireless signal, from a user device, a bearer token request including an identifier that identifies a user, the user device or both. The integrated circuit determines a cryptographic key and uses a time keeping circuit to generate a time value indicative of a window of time for which a bearer token is to be valid. The integrated circuit uses a cryptographic hash to produce the bearer token based on: the identifier, the time value and the cryptographic key. The integrated circuit transmits, via a return short range wireless signal to the user device, the bearer token to enable authentication of the user upon the bearer token being equivalent to a comparison token within the time window.

16 Claims, 7 Drawing Sheets

SYSTEMS AND DEVICES CONFIGURED TO GENERATE AND UTILIZE SHORT-RANGE COMMUNICATION-BASED AUTHENTICATION TOKENS, AND METHODS OF USE THEREOF

FIELD OF TECHNOLOGY

The present disclosure generally relates to computer-based systems and methods configured for short-range communication-based authentication token, including authentication of user permissions and/or user identity based on a cryptographic token carried by a device, such as, without limitation, a card having a radio-frequency enabled chip.

BACKGROUND OF TECHNOLOGY

A security token facilitates access to services, for example in the so-called "cloud", and which improves the security of authentication. Security tokens are typically used in connection with a desktop PC or a laptop to access corporate computing services or networks or on-line bank accounts. This type of authentication is called two-factor authentication, since the user needs, besides the normal user account details, also the security token to be able to get access.

SUMMARY OF DESCRIBED SUBJECT MATTER

In some aspects, the techniques described herein relate to a method including: receiving, by an integrated circuit of a short range wireless card, via a short range wireless signal, from a user device, a bearer token request including an identifier that identifies: a user associated with the user device and a device ID that identifies the user device; determining, by the integrated circuit of the short range wireless card, a first cryptographic key associated with the identifier of the bearer token request; utilizing, by the integrated circuit of the short range wireless card, a time keeping circuit to generate a first time value associated with a current time; wherein the first time value is representative of a window of time starting at the current time so as to be valid throughout the window of time and to become expired upon an end of the window of time from the current time; utilizing, by the integrated circuit of the short range wireless card, at least one first cryptographic hash to produce a bearer token including at least one first hashed value based at least in part on: the identifier, the device ID, the first time value and the first cryptographic key; transmitting, by the integrated circuit of the short range wireless card and via a return short range wireless signal, to the user device, the bearer token; wherein the bearer token is configured to authenticate the user of the user device upon the bearer token being equivalent to a comparison token; wherein the comparison token includes at least one second hashed value produced by at least one second cryptographic hash based at least in part on: the identifier, the device ID, a second time value and a second cryptographic key; wherein the second cryptographic key is associated with the first cryptographic key; and wherein the comparison token is equivalent to the bearer token when the second time value is representative of the time window.

In some aspects, the techniques described herein relate to a method, wherein the short range wireless signal includes a Near-Field Communication (NFC) signal.

In some aspects, the techniques described herein relate to a method, wherein the authentication of the bearer token causes an access control device to actuate a locking mechanism to unlock a door so as to allow access by the user.

In some aspects, the techniques described herein relate to a method, further including: storing, by the integrated circuit of the short range wireless card, the bearer token in a cache; receiving, by the integrated circuit of the short range wireless card, a second bearer token request within the window of time; and transmitting, by the integrated circuit of the short range wireless card and via a second return short range wireless signal, the bearer token to the user device.

In some aspects, the techniques described herein relate to a method, wherein the first key includes a private key associated with the integrated circuit of the short range wireless card, and the second cryptographic key includes a public key associated with the integrated circuit of the short range wireless card.

In some aspects, the techniques described herein relate to a method, wherein the first cryptographic key includes a public key associated with an access control device; wherein the access control device is configured to restrict access until authentication of the bearer token; and wherein the second cryptographic key includes a private key associated with the access control device and held by the access control device.

In some aspects, the techniques described herein relate to a method, wherein the second cryptographic key is published to a network of access control devices as a public key; and wherein each access control device is configured to restrict access until authentication of the bearer token based on the public key.

In some aspects, the techniques described herein relate to a method, wherein the bearer token request further includes at least one restriction associated with authentication of the bearer token; wherein the at least one restriction includes at least one of: a geographic area associated with authentication of the bearer token, a device identifier (ID) associated with a device for which the bearer token is authenticated, a user ID associated with the user for which the bearer token is authenticated, or an entity ID associated with an entity associated with the authentication of the bearer token.

In some aspects, the techniques described herein relate to a method, further including: utilizing, by the integrated circuit of the short range wireless card, the at least one first cryptographic hash to produce the bearer token including the at least one first hashed value based at least in part on the at least one restriction so as to restrict authentication of the bearer token to the at least one restriction.

In some aspects, the techniques described herein relate to a method, wherein the short range wireless card is a smart credit card.

In some aspects, the techniques described herein relate to a system including: a short range wireless card, including: an integrated circuit, wherein the integrated circuit is configured to: receive via a short range wireless signal, from a user device, a bearer token request including: an identifier that identifies a user associated with the user device and a device ID that identifies the user device; determine a first cryptographic key associated with the identifier of the bearer token request; utilize a time keeping circuit to generate a first time value associated with a current time; wherein the first time value is representative of a window of time starting at the current time so as to be valid throughout the window of time and to become expired upon an end of the window of time from the current time; utilize at least one first cryptographic hash to produce a bearer token including at least one first hashed value based at least in part on the identifier, the device ID, the first time value and the first cryptographic key; transmit via a return short range wireless signal, to the user device, the bearer token; wherein the bearer token is configured to authenticate the user of the user device upon the bearer token being equivalent to a comparison token; wherein the comparison token includes at least one second hashed value produced by at least one second cryptographic hash based at least in part on the identifier, the device ID, a second time value and a second cryptographic key; wherein the second cryptographic key is associated with the first cryptographic key; and wherein the comparison token is equivalent to the bearer token when the second time value is representative of the time window.

In some aspects, the techniques described herein relate to a system, wherein the short range wireless signal includes a Near-Field Communication (NFC) signal.

In some aspects, the techniques described herein relate to a system, wherein the authentication of the bearer token causes an access control device to actuate a locking mechanism to unlock a door so as to allow access by the user.

In some aspects, the techniques described herein relate to a system, wherein the integrated circuit is further configured to: store the bearer token in a cache; receive a second bearer token request within the window of time; and transmit via a second return short range wireless signal, the bearer token to the user device.

In some aspects, the techniques described herein relate to a system, wherein the first key includes a private key associated with the integrated circuit, and the second cryptographic key includes a public key associated with the integrated circuit.

In some aspects, the techniques described herein relate to a system, wherein the first cryptographic key includes a public key associated with an access control device; wherein the access control device is configured to restrict access until authentication of the bearer token; and wherein the second cryptographic key includes a private key associated with the access control device and held by the access control device.

In some aspects, the techniques described herein relate to a system, wherein the second cryptographic key is published to a network of access control devices as a public key; and wherein each access control device is configured to restrict access until authentication of the bearer token based on the public key.

In some aspects, the techniques described herein relate to a system, wherein the bearer token request further includes at least one restriction associated with authentication of the bearer token; wherein the at least one restriction includes at least one of: a geographic area associated with authentication of the bearer token, a device identifier (ID) associated with a device for which the bearer token is authenticated, a user ID associated with the user for which the bearer token is authenticated, or an entity ID associated with an entity associated with the authentication of the bearer token.

In some aspects, the techniques described herein relate to a system, wherein the integrated circuit is further configured to: utilize the at least one first cryptographic hash to produce the bearer token including the at least one first hashed value based at least in part on the at least one restriction so as to restrict authentication of the bearer token to the at least one restriction.

In some aspects, the techniques described herein relate to a system, wherein the short range wireless card is a smart credit card.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
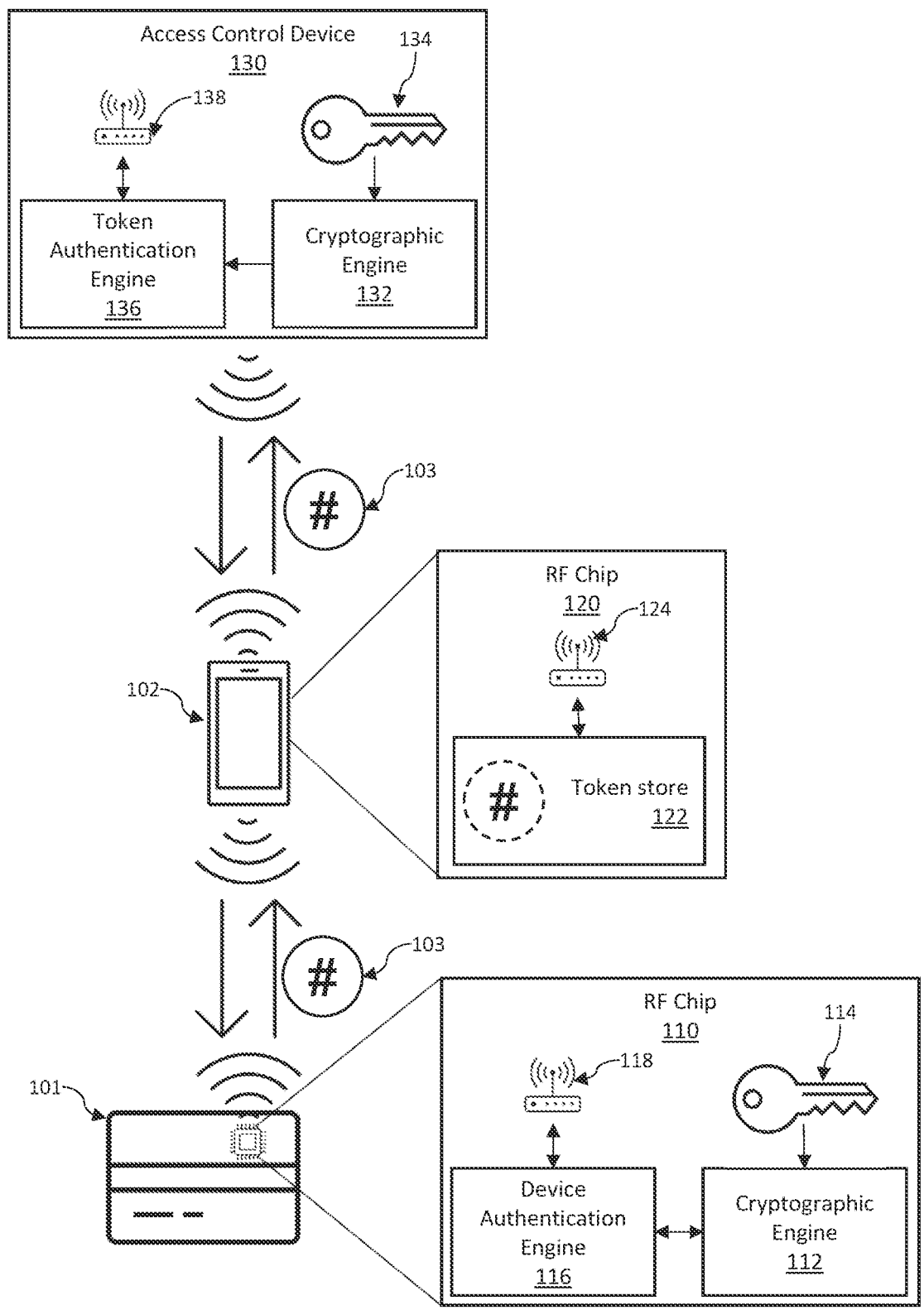
FIG. 1 depicts a short-range communication-based authentication system in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of identity and/or access authentication using a smartcard derived cryptographic token for improved short-range communication-enabled authentication. The following embodiments provide technical solutions and technical improvements that overcome technical problems, drawbacks and/or deficiencies in the technical fields involving multifactor authentication in both physical and/or virtual scenarios where computationally expensive network communications and/or cryptographic operations are typically employed. As explained in more detail, below, technical solutions and technical improvements herein include aspects of improved authentication through offline token generation leveraging secure short-range communications between two or more authentication devices such that the generated token can verify the identity and permissions of a user with an external device. Based on such technical features, further technical benefits become available to users and operators of these systems and methods. Moreover, various practical applications of the disclosed technology are also described, which provide further practical benefits to users and operators that are also new and useful improvements in the art.

Referring to FIG. 1, a short-range communication-based authentication system is illustrated in accordance with one or more embodiments of the present disclosure.

In some embodiments, authentication of user identity and/or user permissions may be effectuated using a token borne by the user and provided to an authentication device for authentication (hereinafter referred to, without limitation, as an illustrative "bearer token"). In some embodiments, to improve the security of access control devices 130, the user may use an illustrative user computing device 102 to authenticate with an illustrative bearer token 103 derived from an illustrative short range wireless card 101 storing one or more cryptographic keys 114 thereon.

In some embodiments, the user computing device 102 and/or the access control device 130 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the user computing device 102 may include a radio frequency chip 120 configured to participate in radio frequency-based electronic communications, including short range (e.g., near field) communications. For example, the RF chip 120 may include a radio 124 configured for, e.g., radio frequency identification (RFID) communication, near-field communication (NFC), Bluetooth®, WiFi, Zigbee, Z-Wave, Thread, cellular (GSM, CDMA, LTE™, 3G, 4G, 5G, 6G, etc.) or other wireless communication technology or any combination thereof.

In some embodiments, NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

In some embodiments, the RF radio 124 may be in communication with a token store 122 configured to securely store the bearer token 103 for access and communication via the RF radio 124. In some embodiments, the token store 122 may include a non-transitory computer readable medium, such as, e.g., a hard drive, solid-state drive, flash drive, or other suitable storage device. In some embodiments, the token store 122 may, additionally or alternatively, include one or more temporary storage devices such as, e.g., a random-access memory, cache, buffer, or other suitable memory device, or any other data storage solution and combinations thereof.

In some embodiments, the token store 122 may be an encrypted storage component in order to facilitate secure storage of the bearer token 103. Accordingly, in some embodiments, the RF radio 124 may access the bearer token 103 in the token store 122 based upon a cryptographic authentication protocol, such as, e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs) or other suitable protocol or any combination thereof.

In some embodiments, the user may use the user computing device 102 to obtain a bearer token 103 by communicating with the short range wireless card 101. In some embodiments, the short range wireless card 101 may include an RF chip 110 configured to generate and transmit the bearer token 103 to the user computing device 102. Accordingly, in some embodiments, the RF chip 110 may include an RF radio 118, a device authentication engine 116, a cryptographic engine 112 and one or more private keys 114 associated with the user. In some embodiments, the RF chip 110 may store the private key(s) 114 in a secure element, e.g., integrated into the RF chip 110 or in a separate component, such as a hardware security module (HSM), encrypted storage, secure coprocessor, or other memory device or any combination thereof.

In some embodiments, the RF chip 110 may include one or more computer processing components including hardware components and/or software components. Examples of hardware components may include processors, microprocessors, circuits, circuit components (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, for example, the RF chip 110 may include an RFID chip having one or more logic circuits including processing and memory components for instantiating the device authentication engine 116 and cryptographic engine 112 and/or for storing the private key(s) 114. In some embodiments, similar to RF chip 120 as detailed above, the RF chip 110 may include encrypted or otherwise secure storage, e.g., to store the private key(s) 114. Accordingly, in some embodiments, the secure storage may be secured based upon a cryptographic authentication protocol, such as, e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs) or other suitable protocol or any combination thereof.

In some embodiments, the processing component(s) of the RF chip 110 may include one or more active and/or passive logic circuits. In some embodiments, an active logic circuit may include powered circuitry that operates on electrical power supplied by a power source, such as a battery, wired external power supply, wireless external power supply or other power supply or any combination thereof. In some embodiments, a passive logic circuit may include circuitry that is configured to utilize magnetic induction to draw power from a received communication signal. In some embodiments, the RF chip 110 may utilize passive and/or active circuitry based on the characteristics of the short range wireless card 101. For example, the short range wireless card 101 may include a battery powered device with an active RF chip 110. In some embodiments, the short range wireless card 101 may be designed as a credit card sized device that is shaped to fit in a wallet, a card reader, or other payment card-related apparatus. Thus, an active RF chip 110 having an internal power supply may result in a short range wireless card 101 that may be thicker than such payment card-related apparatus can accommodate. Accordingly, the RF chip 110 may utilize passive circuitry, thus enabling a thickness of the short range wireless card 101 that may be comparable to a standard payment/credit card that may be in compliance with industry best practices including a Payment Card Industry (PCI) Data Security Standard and International Standard ISO/IEC 7810 (which defines physical characteristics for identification cards) (also, referenced herein in such form as "smart credit card"). There are acceptable alternative credit card designs and alternative payment mechanisms according to these standards that may be utilized in accordance with principles described herein. It is appreciated that the present disclosure does not exclude, from operating as the short range wireless card 101 as described herein, any payment card not in compliance with these standards.

Indeed, in some embodiments, the short range wireless card 101 may include one or more additional features for use as a payment mechanism, such as, e.g., an EMV chip (contactless or non-contactless), magnetic card stripe, printed and/or embossed payment and/or account information, among other features or any combination thereof. In some embodiments, where an EMV chip is included, the EMV chip may be integrated into the RF chip 110 to combine the circuitry of the EMV chip with the circuitry of the device authentication engine 116 and/or the cryptographic engine 112 within the RF chip 110 for shared use of a single RF radio 118, thus reducing components.

In some embodiments, the RF chip 110 may automatically generate a new bearer token 103 in response to an interrogation signal carrying a bearer token request. In some embodiments, to generate the interrogation signal, the user may bring the user computing device 102 and the short range wireless card 101 near to each other such that the RF radio 124 and the RF radio 118 are within range of one another. For example, the user may bring the user computing device 102 and the short range wireless card 101 within, e.g., 2, 3, 4, 5, 6, 7, 8, 9, 10, 11, 12, 13, 14, 15, 16, 17, 18, 19, 20, 21, 22, 23, 24 inches or other short range wireless communication range, e.g., such as within the range of an RFID and/or NFC radio.

In some embodiments, the user computing device 102 may include an active RF chip 120 such that the RF radio 124 is powered by a power source. While under power, the RF chip 120 may emit periodic and/or continuous interrogation signals to attempt to initiate communication with a recipient RF chip, such as the RF chip 110 of the short range wireless card 101. In some embodiments, the RF chip 120 may be powered to emit the interrogation signal, e.g., automatically at a predetermined period (e.g., every 2, 5, 10, 15, 20, 30, 45, 60 seconds or other period), upon initiation by user selection via an interface of the user computing device 102, automatically in response to a ping, poll or interrogation signal by another device, or by any other trigger or any combination thereof.

Accordingly, in some embodiments, upon being within range of the user computing device 102, the RF radio 118 of the short range wireless card 101 may receive the interrogation signal from the RF chip 120. In some embodiments, the interrogation signal may energize circuitry within the RF chip 110 causing the circuitry to be powered by the energy of the interrogation signal. In some embodiments, the RF radio 118 and/or the circuitry may be configured to, upon being energized, extract data from the interrogation signal. In some embodiments, the data may include the bearer token request including bear token request data defining parameters of a requested bearer token.

In some embodiments, the parameters of the requested bearer token may include, e.g., a device identifier (ID) that identifies the user computing device 102, an application ID identifying software and/or an application of the user computing device 102, a user ID identifying the user, a time of the interrogation signal, a location associated with the user computing device 102, a password authenticating the user, a cryptographic key authenticating the user and/or the hardware/software of the user computing device 102, one or more restrictions on the requested bearer token, among other parameters or any combination thereof.

In some embodiments, the one or more restrictions may be preconfigured, user configured, or automatically configured restrictions on the validity of the requested bearer token so as to increase the security of the bearer token 103 and the confidence of authentication with the bearer token 103. In some embodiments, the restrictions may be selected via a restriction selection user interface presented to the user, e.g., on the user computing device 102. The user may select a purpose, time, geofencing, entity whitelist, entity blacklist, or other restrictions or any combination thereof that define where, when and with whom the bearer token 103 may be used to authenticate the user. For example, the user may select restrictions for the requested bearer token to provide authentication for admittance to a gated event or flight. Thus, the characteristics of the gated event or flight may be selected, such as where and/or when the gated event is to occur or where the flight is set to take off from, as well as a duration and/or any intermissions/layovers, the host of the gated event, the airline of the flight, the airport of the flight, among other characteristics or any combination thereof. The characteristics may define the restrictions such that the requested bearer token is only for the gated event/flight.

In some embodiments, the characteristics may be automatically generated based on user selection of certain identifying information, such as, e.g., an itinerary identifier, booking ID, calendar event, social media listing, online advertisement, etc., In some embodiments, the identifying information may be automatically detected, e.g., from user transaction records associated with a payment account of the short range wireless card 101. For example, a detection algorithm implemented by an account management system may automatically detect when a user engages in transactions to purchase tickets for a gated event, flight, hotel, or other event or any combination thereof. The detection algorithm may then extract transaction data and/or reference identifying information associated with the event from another datastore, platform, system, network and/or service.

In some embodiments, the characteristics and/or restrictions may be automatically recommended to the user via a recommendation model including, e.g., one or more artificial intelligence (AI) and/or machine learning techniques. In some embodiments, the AI/machine learning techniques may be chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  a. define Neural Network architecture/model,
  b. transfer the input data to the exemplary neural network model,
  c. train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination with any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination with any embodiment described above or below, the exemplary aggregation function may be a mathematical function that combines (e.g., sum, product, etc.) input signals to the node. In some embodiments and, optionally, in combination with any embodiment described above or below, an output of the exemplary aggregation function may be used as input to the exemplary activation function. In some embodiments and, optionally, in combination with any embodiment described above or below, the bias may be a constant value or function that may be used by the aggregation function and/or the activation function to make the node more or less likely to be activated.

In some embodiments, the recommendation model ingests a feature vector that encodes features representative of identifying information. In some embodiments, the recommendation model processes the feature vector with parameters to produce a prediction of recommendations for characteristics and/or restrictions. In some embodiments, the parameters of the recommendation model may be implemented in a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the recommendation model may advantageously include a random forest classification model.

In some embodiments, the recommendation model processes the features encoded in the feature vector by applying the parameters of the classifier machine learning model to produce a model output vector. In some embodiments, the model output vector may be decoded to generate one or more labels indicative of recommendations for characteristics and/or restrictions. In some embodiments, the model output vector may include or may be decoded to reveal a numerical output, e.g., one or more probability values between 0 and 1 where each probability value indicates a degree of probability that a particular label correctly classifies the identifying information. In some embodiments, the recommendation model may test each probability value against a respective probability threshold. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the identifying information is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the recommendation model may produce the recommendations for characteristics and/or restrictions for a particular identifying information based on the probability value(s) of the model output vector and the probability threshold(s).

In some embodiments, the parameters of the recommendation model may be trained based on known outputs. For example, the identifying information may be paired with a target classification or known classification to form a training pair, such as a historical identifying information and an observed result and/or human annotated classification denoting whether the historical identifying information is recommendation for characteristics and/or restrictions. In some embodiments, the identifying information may be provided to the recommendation model, e.g., encoded in a feature vector, to produce a predicted label. In some embodiments, an optimizer associated with the recommendation model may then compare the predicted label with the known output of a training pair including the historical identifying information to determine an error of the predicted label. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the recommendation model produces the prediction, such as in online learning scenarios. In such a scenario, the recommendation model may receive the identifying information and generate the model output vector to produce a label classifying the identifying information. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the identifying information to form the training pair and the optimizer may determine an error of the predicted label using the feedback.

In some embodiments, based on the error, the optimizer may update the parameters of the recommendation model using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer may update the parameters of the recommendation model based on the error of predicted labels in order to train the recommendation model to model the correlation between identifying information and recommendations for characteristics and/or restrictions in order to produce more accurate labels of identifying information.

In some embodiments, the interrogation signal may carry all of the parameters of the requested bearer token, including the restrictions. In some embodiments, to reduce the power consumption of regularly and/or continually emitted an interrogation signal with all of the parameters of the requested bearer token, the user computing device 102 may emit an interrogation signal configured to initiate communication with the short range wireless card 101. Thus, upon receiving the interrogation signal, the RF radio 118 may automatically recognize the interrogation signal as an initiation for communication and return an acknowledgement to the RF radio 124. In sending the acknowledgement, the RF radio 124 may automatically determine that the short range wireless card 101 is within range and may generate and emit a second interrogation signal carrying the parameters for the requested bearer token to form the bearer token request.

In some embodiments, the RF radio 118 may receive the second interrogation signal and extract the parameters of the requested bearer token. In some embodiments, the RF chip 110 may initiate one or more sets of programming instructions (e.g., an application, applet, software package, application-specific integrated circuit instructions, etc.) that cause the circuitry of the RF chip 110 to instantiate the device authentication engine 116 to authenticate the user computing device 102 as being a permissioned to bear the bearer token 103.

In some embodiments, the device authentication engine 116 may be configured to authenticate the user computing device 102. Accordingly, the device authentication engine 116 may include authoritative data written to a memory thereof. The authoritative data defines the identity of permissions users, software and/or hardware for receiving bearer tokens. In some embodiments, the authoritative data may include, e.g., a public key, a permissioned device ID identifying a permissioned device, a permissioned application ID identifying permissioned software, a permissioned user ID and/or account ID identifying a permissioned user and/or account associated with a permissioned user, among other data or any combination thereof. In some embodiments, the device authentication engine 116 may compare the bearer token request to the authoritative data to determine an authorization of the user computing device 102. For example, the device authentication engine 116 may use a stored public key to authenticate a message authentication code (MAC) associated with the bearer token request and/or the interrogation signal. Alternatively, or in addition, the public key may be paired to a user password provided in the bearer token request such that the device authentication engine 116 may validate the user password based on the public key. Alternatively, or in addition, the device authentication engine 116 may verify that the device ID, application ID, user ID among other identifiers of the bearer token request match the authoritative data and/or an identifier associated with the private key 114.

In some embodiments, upon authenticating the user computing device 102 based on the bearer token request, the RF chip 110 may initiate one or more sets of programming instructions (e.g., an application, applet, software package, application-specific integrated circuit instructions, etc.) that cause the circuitry of the RF chip 110 to instantiate the cryptographic engine 112. In some embodiments, the cryptographic engine 112 may use the private key 114 and the parameters of the requested bearer token to generate a cryptographic token that forms the bearer token 103.

In some embodiments, the cryptographic engine 112 may include circuitry configured to implement a hash function. In some embodiments, the hash function may include, e.g., MD5, RIPEMD-160, RTRO, SHA-1, SHA-2, Tiger (TTH), WHIRLPOOL, RNGs, block cipher algorithms (e.g., IDEA, RC2, RC5, CAST and Skipjack), Triple Data Encryption Standard (3DES), or other suitable hash function or any combination thereof. Thus, the inputs to the hash function may produce a unique output (e.g., numerical or alphanumerical output) that cannot be reversed to recreate the inputs (e.g., one-way). Accordingly, the output is dependent on the inputs and the private key 114. As such, restrictions on the bearer token 103 may be embedded in the bearer token 103 itself via the output of the hash function by making the output dependent on the parameters and/or restrictions of the bearer token request.

In some embodiments, the bearer token 103 may be made limited in time by embedding a time period defining validity of the bearer token 103. For example, a time keeping circuit of the cryptographic engine 112 may generate a time value associated with a current time. The cryptographic engine 112 may utilize the current time as a start to a window of time that defines the time period of validity. As such, the cryptographic engine 112 may define the window as the time period within which the current time occurs. For example, for preset time periods, such as, e.g., every 2 hours, 3 hours, 4 hours, 6 hours, 8 hours, 10 hours, 12 hours, 24 hours, or other period of time in a range of between 1 hour and 1 month, the preset time periods may be preset for each time period (e.g., for a two hour time period, 4:00 AM to 6:00 AM, followed by 6:00 AM to 8:00 AM, followed by 8:00 AM to 10:00 AM, etc. every day). Thus, the current time may be located within a particular preset time period.

In some embodiments, the window of time may be defined using the current time as a start time. Thus, the window of time may be a preset amount of time and/or an amount of time defined in the parameters of the bearer token request. The time period of the validity of the bearer token 103 may then become the window of time following the current time.

In some embodiments, whether using preset time periods or the window of time following the current time, the period of time of validity may be encoded into a particular time code (e.g., by algorithmic encoding, such as an indicia indicative of which time period, concatenating a value indicative of the current with a value indicative of the length of the window of time, with a value indicative of the day and/or date, among other time-related values, or by other encoding techniques). Thus, the time code may be used as an input to the hash function such that the window of time is embedded within the output. As a result, the output of the hash function cannot be recreated without using the same time code as input.

Similarly, in some embodiments, the geofencing restrictions, entity restrictions, and other restrictions may be embedded into the output of the hash function may encoding each restriction into a code (e.g., a geofence code, entity code, etc.).

In some embodiments, to prevent a replay attack, the cryptographic engine 112 may input a one-time code into the hash function. The one-time code may be a unique value that is synchronized with the access control device 130 and/or the user computing device 102 but that expires upon use or after a predetermined period of time so that attackers cannot intercept and reuse the bearer token 103. In some embodiments, the cryptographic engine 112 may generate the one-time code using, e.g., a time-based value, a random value, a counter, or other variable. For example, the time keeping circuit may generate the current time, which may be encoded and input as the one-time code. Alternatively, or in addition, a random number generator circuit, a pseudo-random number generator (PRNG) circuit, a cryptographic pseudo-random number generator (CPRNG) circuit, or other circuit may generate a random value for use as the one-time code.

In some embodiments, the cryptographic engine 112 may restrict the bearer token 103 to use by the user computing device 102 by using the device ID and/or application ID associated with the user computing device 102 as an input to the hash function. In some embodiments, the user computing device 102 may be configured, via an access requesting or bearer token communication application, to provide to the access control device 130 the device ID and/or the application ID alongside the bearer token 103. Alternatively, or in addition, the access control device 130 may be configured to only validate the bearer token 103 if the user computing device 102 provides the device ID and/or application ID, whether alongside the bearer token 103 or separately. Thus, the device ID and/or the application ID may be used as an input to the hash function such that the output of the hash function is only reproducible when the bearer token 103 is provided by the user computing device 102.

In some embodiments, the cryptographic engine 112 may use the hash function to produce the output based on the private key 114 and the inputs including, e.g., the time value, the one-time code, the device ID, the application ID, the geofence, the location, the user account ID, the user ID, or other input or any combination thereof. As a result, the hash function may produce a cryptographic code that forms the bearer token 103. In some embodiments, the cryptographic code may be the bearer token 103, or may be modified or otherwise processed to derive the bearer token 103. For example, the cryptographic engine 112 may format the cryptographic code (e.g., as a value, string, etc.), separate portions of the cryptographic code to create multiple code segments according to a predetermined logic for segmenting the cryptographic code, trim beginning and/or ending characters in the cryptographic code to form a trimmed code, or other processing of the cryptographic code or any combination thereof to derive the bearer token 103.

Accordingly, in some embodiments, the system may include using the chip on a card 101 to generate a bearer token 103 that can be used for authentication for a set period of time. The system allows a user to tap a card 101 to their user computing device 102 (e.g., a mobile device) and generate a token that is tied to the specific mobile device with a specified time duration. The generated token can be used to authenticate until it expires, so the user will not need to enter credentials after the token is generated.

In some embodiments, this system incorporates multiple security features to create a secure token. For example, one or more applets with an internal private key 114 that is used to sign a token. Because the key 114 exists only within the secure element of the card 101 and token signing happens on the card 101 the private key 114 is never exposed. As part of the signing process the device ID may be passed to the card 101 as part of the token that is signed. This locks the token to the specific user computing device 102, so the token could not be stolen and used on other devices. Using both a mobile device and the card as part of token generation serves as an enhanced form of authentication proving the user is both in possession of the mobile device and physical credit card. An expiration date is included in the token to ensure it has a limited lifespan.

In some embodiments, once this token is generated it can be used as a source of authentication until it expires, so users will not be required to authenticate again during the token's lifespan. Because of the security mechanism around this process it serves as a form of two factor authentication. When the token expires, the user can renew the token by tapping the credit card to the mobile again to generate a new token.

In some embodiments, the token signing can be done with public/private key, or with shared symmetric key operations. The distinction between this and other authentication standards is that it would be optimized for processing by payment security equipment (HSMs). Using derived and session keys may allow the backend to recreate the keys to validate the token without undue key management resource demands.

In some embodiments, the secure element of the short range wireless card 101 may temporarily cache the bearer token 103, e.g., for the valid period of time of the bearer token 103 based on the time value. Thus, if the bearer token 103 is corrupted or deleted at the user computing device 102, the user may again tap the short range wireless card 101 and the user computing device 102 during the valid period of the bearer token 103, and the short range wireless card 101 may return the bearer token 103 without the need to create a new bearer token 103, thus increasing speed and efficiency.

In some embodiments, the RF radio 118 of the short range wireless card 101 may return the bearer token 103 to the user computing device 102 in a return signal in response to the interrogation signal. Thus, the bearer token 103 may be transmitted to the user computing device 102 to be received by the RF radio 124 and stored in a token store 122 for later transmission during authentication. In some embodiments, the token store 122 may be a secure element of the RF chip 120, or may be a separate memory device such as a HSM, encrypted storage, secure coprocessor, or other memory device or any combination thereof.

In some embodiments, the access control device 130 may be configured to authenticate the user based on the bearer token 103. The access control device 130 may be associated with one or more restricted objects, spaces, services, data, events, or other things for which access by users may be controlled or any combination thereof. For example, the access control device 130 may be associated with a locker that is configured to actuate a lock to unlock the locker upon validation of the bearer token 103 so as to allow the user to access contents of the locker. In another example, the access control device 130 may be associated with a ticketed event and/or location (e.g., flight, concert, movie, play, performance, gallery, studio, workspace, hotel, etc.) such that upon validation of the bearer token 103, the access control device 130 may instruct a display to present the validation to allow entry and/or actuate a gating mechanism (e.g., a turnstyle, door lock, or other gating mechanism or combination thereof) to allow access based on the validation. In another example, the access control device 130 may be a computing device having software that is configured to restrict access to one or more files, documents, data objects, software services or other data or combination thereof until validation of the bearer token 103.

Thus, in some embodiments, to access the restricted objects, spaces, services, data, events, etc., the user may present the user computing device 102 such that the RF radio 124 is brought into range of the RF radio 138 of the access control device 130. Similar to initiating communications with the short range wireless card 101, an interrogation signal may be emitted periodically and/or continuously by the RF radio 124, by the RF radio 138, or both. The interrogation signal may commence an exchange of communications between the access control device 130 and the RF chip 120. For example, the RF radio 138 may send a request for authenticating information to the RF radio 124, which the RF radio 124 may be configured to automatically respond to with the bearer token 103. Alternatively, or in addition, the RF radio 124 may emit an access request carrying the bearer token 103 and requesting access via the access control device 130 based on authentication of the bearer token 103. In some embodiments, other sequences of communications resulting in the bearer token 103 being transmitted to the access control device 130 are contemplated.

In some embodiments, the RF radio 138 may receive the bearer token 103 and automatically implement a token authentication engine 136 and a cryptographic engine 132. In some embodiments, the token authentication engine 136 and/or the cryptographic engine 132 may each include circuitry integrated on-chip with the RF radio 138, as a separate processing component (e.g., a coprocessor or processor), or a combination thereof. In some embodiments, the access control device 130, the RF radio 138, the authentication engine 136 and/or the cryptographic engine 132 or any combination thereof may include or be incorporated into a passive device or active device, or any combination thereof.

In some embodiments, the authentication engine 136 may compare the bearer token 103 to a locally generated authentication token. The locally generated authentication token may include authoritative authentication data that is used to determine whether the bearer token 103 is valid, e.g., whether the bearer token 103 represents valid data for, e.g., time, location, device, software, user, etc. Thus, the authentication data may correspond to the inputs of the hash function implemented by the cryptographic engine 112 of the short range wireless card 101 and be signed with a key corresponding to the private key 114.

Accordingly, in some embodiments, the authentication engine 136 may utilize the output of the cryptographic engine 112. The cryptographic engine 112 may include circuitry configured to generate an output based on the authoritative data and a public key 134 such that where the authoritative data matches the inputs for the bearer token 103 and the public key 134 corresponds to the private key 114, the authentication token and the bearer token 103 match. Thus, as detailed above, the access control device 130 may be configured to request, and/or the user computing device 102 may be configured to provide, in the access request one or more identifiers including, e.g., the device ID, application ID, user ID, user account ID, or other identifier or combination thereof, a location, a time associated with transmission of the access request, or other information or any combination thereof. Alternatively, or additionally, the access control device 130 may utilize local information, such as, e.g., a locally generated current time generated by a time keeping circuit, a random number generated by a random number generator or PRNG or CPRNG or other generator, a locally stored and/or determined location (e.g., via GPS or other location determination mechanism), or other locally provided information or any combination thereof. Thus, in some embodiments, the location and time, among other parameters, at the time and place of the access request may be used to test the bearer token 103 for authentication and access permissions.

To do so, in some embodiments, similar to the cryptographic engine 112 detailed above, the cryptographic engine 132 may access the public key 134. The public key 134 may be stored in a secure element of the access control device, such as, e.g., an HSM, an encrypted storage, secure coprocessor, or other memory device or any combination thereof. In some embodiments, the public key 134 may be generated by an authentication server in communication with the user computing device 202 and/or the access control device 230, e.g., via a network. The authentication server may disseminate and/or publish the public key to a particular access control device 230 associated with the request, e.g., based on communication with the user computing device 202, and/or to all access control devices 230 in a network of access control devices 230. Thus, the access control device 230 may download the public key 234 from the authentication server that maintains authoritative public keys associated with each user and/or user account, and thus may maintain a public key associated with the short range wireless card 101 and/or the private key 114. In some embodiments, therefore, the private key 114 is used to sign the bearer token 103 and the public key 134 is used to verify the signature. In some embodiments, the distribution of keys may be reversed, where the public key 134 associated with the access control device 130 is loaded onto the short range wireless card 101 to enable the short range wireless card 101 to encrypt the bearer token 103 for decryption by the access control device 130, e.g., using a private key held by the access control device 130. In some embodiments, this arrangement is referred to as public key encryption or asymmetric cryptography. Other types of cryptographic may be implemented, such as symmetric key cryptographic where the access control device 130 and the short range wireless card 101 share the same secret key. In symmetric key cryptography, the authentication server may provide, via a secure communication channel, a copy of the private key 114 to the access control device 130. Such an arrangement, however, may have increased risks of security attacks due to the private key 114 being exchanged with an additional device.

In some embodiments, the cryptographic engine 132 may determine a time period associated with the access request based on the current time. In some embodiments, the time period may be determined based on the same preset time period structure implemented by the short range wireless card 101 to ensure consistency. As a result, if the time period calculated by the cryptographic engine 132 is calculated in the same way as the cryptographic engine 112, the if the current time of the access request matches the current time of the bearer token 103, then the bearer token 103 and the access request apply to the same time period resulting in matching inputs to the hash function at both the cryptographic engine 112 and the cryptographic engine 132.

Similarly, location may be mapped to predetermined regions (e.g., towns, zip codes, cities, states, geographic regions, cartographic regions, longitude-latitude ranges, etc.). Thus, where the location of the access request is mapped to a matching region as the location of the bearer token 103, then the inputs to the hash function at both the cryptographic engine 112 and the cryptographic engine 132 may match.

In some embodiments, the cryptographic engine 132 may use the hash function to produce an output based on the public key 134 and the inputs including, e.g., the time period, a one-time code, the device ID, the application ID, the user ID, the user account ID, the location region, or other input or any combination thereof. As a result, the hash function may produce a cryptographic code that forms the authentication token. In some embodiments, the cryptographic code may be the authentication token, or may be modified or otherwise processed to derive the authentication token. For example, the cryptographic engine 132 may format the cryptographic code (e.g., as a value, string, etc.), separate portions of the cryptographic code to create multiple code segments according to a predetermined logic for segmenting the cryptographic code, trim beginning and/or ending characters in the cryptographic code to form a trimmed code, or other processing of the cryptographic code or any combination thereof to derive the authentication token.

In some embodiments, where the inputs to the hash function at both the cryptographic engine 112 and the cryptographic engine 132 match, both the cryptographic engine 112 and the cryptographic engine 132 use a common hash function, the public key 134 corresponds to the private key 114, and common post-processing steps to derive a cryptographic token are taken, then the authentication token produced by the cryptographic engine 132 may match the bearer token 103. Accordingly, the authentication engine 136 may compare the authentication token to the bearer token 103. Where the bearer token 103 matches the authentication token, the private key 114 and the inputs used to derive the bearer token 103 are valid, including, e.g., the time period, the location, the user ID, the device ID, the user account ID, the one-time code, or other input or any combination thereof. As a result, the authentication engine 136 may validate the bearer token 103 to authorize access by the user (e.g., enable access to data and/or software services, actuate a lock or gating mechanism, present access authorization to personnel controlling access, or any combination thereof). Thus, the bearer token 103 may provide strong cryptographic authentication of the user and other restrictions for securely controlled access.

Figure 2:
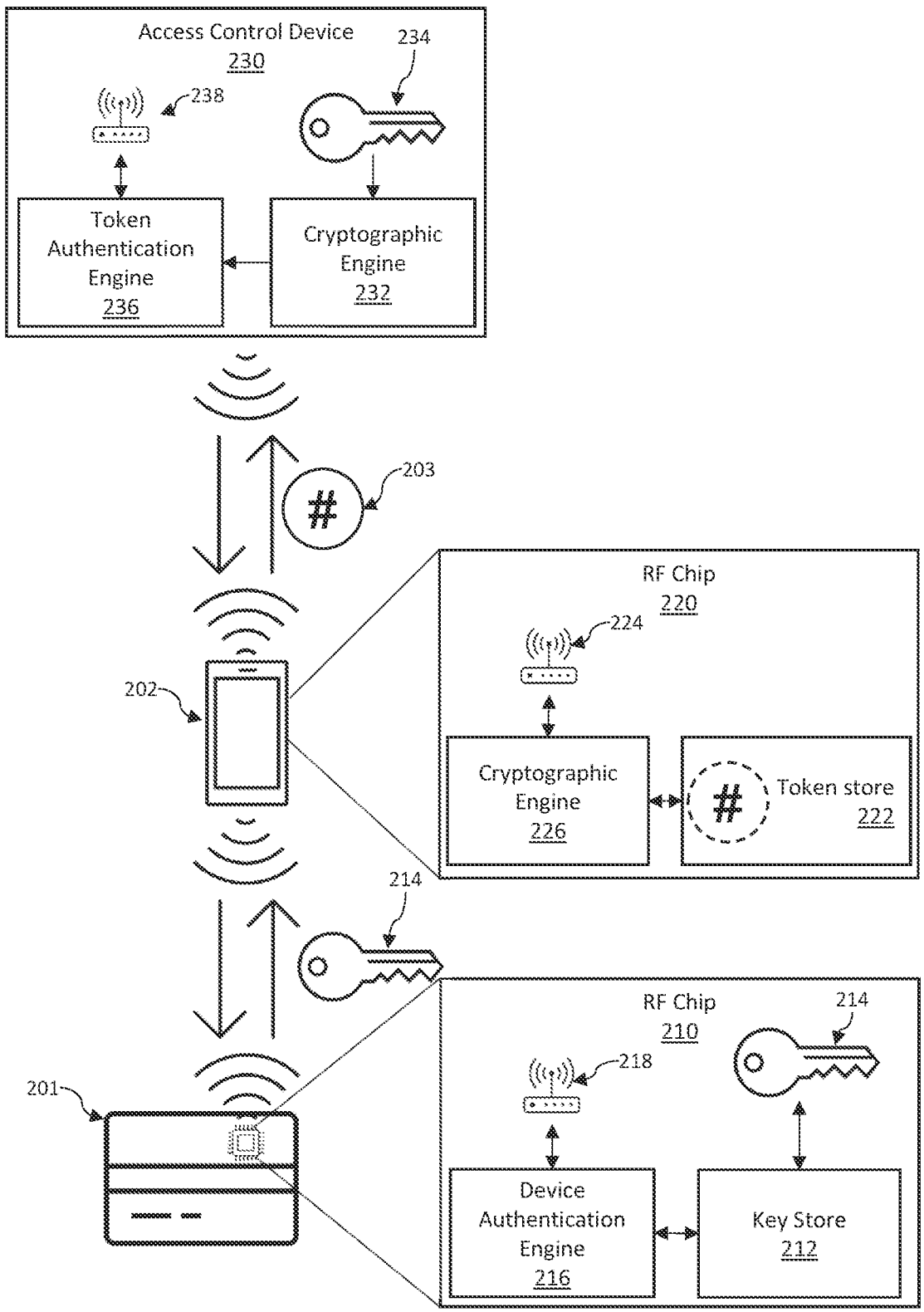
FIG. 2 depicts another short-range communication-based authentication system in accordance with one or more embodiments of the present disclosure.

Referring to FIG. 2, another short-range communication-based authentication system is illustrated in accordance with one or more embodiments of the present disclosure.

In some embodiments, authentication of user identity and/or user permissions may be effectuated using a token borne by the user and provided to an authentication device for authentication (hereinafter referred to as a "bearer token"). In some embodiments, to improve the security of access control devices 230, the user may use a user computing device 202 to authenticate with a bearer token 203 derived from a short range wireless card 201 storing one or more cryptographic keys 214 thereon.

In some embodiments, the user computing device 202 and/or the access control device 230 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the user computing device 202 may include a radio frequency chip 220 configured to participate in radio frequency-based electronic communications, including short range (e.g., near field) communications. For example, the RF chip 220 may include a radio 224 configured for, e.g., radio frequency identification (RFID) communication, near-field communication (NFC), Bluetooth®, WiFi, Zigbee, Z-Wave, Thread, cellular (GSM, CDMA, LTE™, 3G, 4G, 5G, 6G, etc.) or other wireless communication technology or any combination thereof.

In some embodiments, NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 20 cm or less. In some embodiments, the NFC may operate at 23.56 MHz on ISO/IEC 28000-3 air interface and at rates ranging from 206 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

In some embodiments, the RF radio 224 may be in communication with a token store 222 configured to securely store the bearer token 203 for access and communication via the RF radio 224. In some embodiments, the token store 222 may include a non-transitory computer readable medium, such as, e.g., a hard drive, solid-state drive, flash drive, or other suitable storage device. In some embodiments, the token store 222 may, additionally or alternatively, include one or more temporary storage devices such as, e.g., a random-access memory, cache, buffer, or other suitable memory device, or any other data storage solution and combinations thereof.

In some embodiments, the token store 222 may be an encrypted storage component in order to facilitate secure storage of the bearer token 203. Accordingly, in some embodiments, the RF radio 224 may access the bearer token 203 in the token store 222 based upon a cryptographic authentication protocol, such as, e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs) or other suitable protocol or any combination thereof.

In some embodiments, the user may use the user computing device 202 to obtain a bearer token 203 by communicating with the short range wireless card 201. In some embodiments, the short range wireless card 201 may include an RF chip 210 configured to generate and transmit the bearer token 203 to the user computing device 202. Accordingly, in some embodiments, the RF chip 210 may include an RF radio 218, a device authentication engine 216, a key store 212 storing one or more private keys 214 associated with the user. In some embodiments, the key store 212 may include a secure element, e.g., integrated into the RF chip 210 or in a separate component, such as a hardware security module (HSM), encrypted storage, secure coprocessor, or other memory device or any combination thereof.

In some embodiments, the RF chip 210 may include one or more computer processing components including hardware components and/or software components. Examples of hardware components may include processors, microprocessors, circuits, circuit components (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, for example, the RF chip 210 may include an RFID chip having one or more logic circuits including processing and memory components for instantiating the device authentication engine 216 and key store 212. In some embodiments, similar to RF chip 220 as detailed above, the RF chip 210 may include encrypted or otherwise secure storage, e.g., to store the private key(s) 214. Accordingly, in some embodiments, the secure storage may be secured based upon a cryptographic authentication protocol, such as, e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs) or other suitable protocol or any combination thereof.

In some embodiments, the processing component(s) of the RF chip 210 may include one or more active and/or passive logic circuits. In some embodiments, an active logic circuit may include powered circuitry that operates on electrical power supplied by a power source, such as a battery, wired external power supply, wireless external power supply or other power supply or any combination thereof. In some embodiments, a passive logic circuit may include circuitry that is configured to utilize magnetic induction to draw power from a received communication signal. In some embodiments, the RF chip 210 may utilize passive and/or active circuitry based on the characteristics of the short range wireless card 201. For example, the short range wireless card 201 may include a battery powered device with an active RF chip 210. In some embodiments, the short range wireless card 201 may be designed as a credit card sized device that is shaped to fit in a wallet, a card reader, or other payment card-related apparatus. Thus, an active RF chip 210 having an internal power supply may result in an illustrative short range wireless card 201 that is thicker than such payment card-related apparatus can accommodate. Accordingly, the RF chip 210 may utilize passive circuitry, thus enabling a thickness of the short range wireless card 201 that is comparable to a standard payment card.

Indeed, in some embodiments, the short range wireless card 201 may include one or more additional features for use as a payment mechanism, such as, e.g., an EMV chip (contactless or non-contactless), magnetic card stripe, printed and/or embossed payment and/or account information, among other features or any combination thereof. In some embodiments, where an EMV chip is included, the EMV chip may be integrated into the RF chip 210 to combine the circuitry of the EMV chip with the circuitry of the device authentication engine 216 and/or the key store 212 within the RF chip 210 for shared use of a single RF radio 218, thus reducing components.

In some embodiments, the RF chip 210 may automatically provide the private key 214 in response to an interrogation signal carrying a bearer token request. In some embodiments, to generate the interrogation signal, the user may bring the user computing device 202 and the short range wireless card 201 near to each other such that the RF radio 224 and the RF radio 218 are within range of one another.

For example, the user may bring the user computing device 202 and the short range wireless card 201 within, e.g., 2, 3, 4, 5, 6, 7, 8, 9, 20, 21, 22, 23, 24, 25, 26, 27, 28, 29, 20, 21, 22, 23, 24 inches or other short range wireless communication range, e.g., such as within the range of an RFID and/or NFC radio.

In some embodiments, the user computing device 202 may include an active RF chip 220 such that the RF radio 224 is powered by a power source. While under power, the RF chip 220 may emit periodic and/or continuous interrogation signals to attempt to initiate communication with a recipient RF chip, such as the RF chip 210 of the short range wireless card 201. In some embodiments, the RF chip 220 may be powered to emit the interrogation signal, e.g., automatically at a predetermined period (e.g., every 2, 5, 20, 25, 20, 30, 45, 60 seconds or other period), upon initiation by user selection via an interface of the user computing device 202, automatically in response to a ping, poll or interrogation signal by another device, or by any other trigger or any combination thereof.

Accordingly, in some embodiments, upon being within range of the user computing device 202, the RF radio 218 of the short range wireless card 201 may receive the interrogation signal from the RF chip 220. In some embodiments, the interrogation signal may energize circuitry within the RF chip 210 causing the circuitry to be powered by the energy of the interrogation signal. In some embodiments, the RF radio 218 and/or the circuitry may be configured to, upon being energized, extract data from the interrogation signal. In some embodiments, the data may include the bearer token request including bear token request data defining parameters of a requested bearer token.

In some embodiments, the parameters of the requested bearer token may include, e.g., a device identifier (ID) that identifies the user computing device 202, an application ID identifying software and/or an application of the user computing device 202, a user ID identifying the user, a time of the interrogation signal, a location associated with the user computing device 202, a password authenticating the user, a cryptographic key authenticating the user and/or the hardware/software of the user computing device 202, one or more restrictions on the requested bearer token, among other parameters or any combination thereof.

In some embodiments, the one or more restrictions may be preconfigured, user configured, or automatically configured restrictions on the validity of the requested bearer token so as to increase the security of the bearer token 203 and the confidence of authentication with the bearer token 203. In some embodiments, the restrictions may be selected via a restriction selection user interface presented to the user, e.g., on the user computing device 202. The user may select a purpose, time, geofencing, entity whitelist, entity blacklist, or other restrictions or any combination thereof that define where, when and with whom the bearer token 203 may be used to authenticate the user. For example, the user may select restrictions for the requested bearer token to provide authentication for admittance to a gated event or flight. Thus, the characteristics of the gated event or flight may be selected, such as where and/or when the gated event is to occur or where the flight is set to take off from, as well as a duration and/or any intermissions/layovers, the host of the gated event, the airline of the flight, the airport of the flight, among other characteristics or any combination thereof. The characteristics may define the restrictions such that the requested bearer token is only for the gated event/flight.

In some embodiments, the characteristics may be automatically generated based on user selection of certain identifying information, such as, e.g., an itinerary identifier, booking ID, calendar event, social media listing, online advertisement, etc. In some embodiments, the identifying information may be automatically detected, e.g., from user transaction records associated with a payment account of the short range wireless card 201. For example, a detection algorithm implemented by an account management system may automatically detect when a user engages in transactions to purchase tickets for a gated event, flight, hotel, or other event or any combination thereof. The detection algorithm may then extract transaction data and/or reference identifying information associated with the event from another datastore, platform, system, network and/or service.

In some embodiments, the characteristics and/or restrictions may be automatically recommended to the user via a recommendation model including, e.g., one or more artificial intelligence (AI) and/or machine learning techniques. In some embodiments, the AI/machine learning techniques may be chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

g. define Neural Network architecture/model,
    h. transfer the input data to the exemplary neural network model,
    i. train the exemplary model incrementally,
    j. determine the accuracy for a specific number of timesteps,
    k. apply the exemplary trained model to process the newly-received input data,
    l. optionally and in parallel, continue to train the exemplary trained model with a predetermined periodicity.

In some embodiments and, optionally, in combination with any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination with any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination with any embodiment described above or below, the exemplary aggregation function may be a mathematical function that combines (e.g., sum, product, etc.) input signals to the node. In some embodiments and, optionally, in combination with any embodiment described above or below, an output of the exemplary aggregation function may be used as input to the exemplary activation function. In some embodiments and, optionally, in combination with any embodiment described above or below, the bias may be a constant value or function that may be used by the aggregation function and/or the activation function to make the node more or less likely to be activated.

In some embodiments, the recommendation model ingests a feature vector that encodes features representative of identifying information. In some embodiments, the recommendation model processes the feature vector with parameters to produce a prediction of recommendations for characteristics and/or restrictions. In some embodiments, the parameters of the recommendation model may be implemented in a suitable machine learning model including a classifier machine learning model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the recommendation model may advantageously include a random forest classification model.

In some embodiments, the recommendation model processes the features encoded in the feature vector by applying the parameters of the classifier machine learning model to produce a model output vector. In some embodiments, the model output vector may be decoded to generate one or more labels indicative of recommendations for characteristics and/or restrictions. In some embodiments, the model output vector may include or may be decoded to reveal a numerical output, e.g., one or more probability values between 0 and 2 where each probability value indicates a degree of probability that a particular label correctly classifies the identifying information. In some embodiments, the recommendation model may test each probability value against a respective probability threshold. In some embodiments, each probability value has an independently learned and/or configured probability threshold. Alternatively or additionally, in some embodiments, one or more of the probability values of the model output vector may share a common probability threshold. In some embodiments, where a probability value is greater than the corresponding probability threshold, the identifying information is labeled according to the corresponding label. For example, the probability threshold can be, e.g., greater than 0.5, greater than 0.6, greater than 0.7, greater than 0.8, greater than 0.9, or other suitable threshold value. Therefore, in some embodiments, the recommendation model may produce the recommendations for characteristics and/or restrictions for a particular identifying information based on the probability value(s) of the model output vector and the probability threshold(s).

In some embodiments, the parameters of the recommendation model may be trained based on known outputs. For example, the identifying information may be paired with a target classification or known classification to form a training pair, such as a historical identifying information and an observed result and/or human annotated classification denoting whether the historical identifying information is recommendation for characteristics and/or restrictions. In some embodiments, the identifying information may be provided to the recommendation model, e.g., encoded in a feature vector, to produce a predicted label. In some embodiments, an optimizer associated with the recommendation model may then compare the predicted label with the known output of a training pair including the historical identifying information to determine an error of the predicted label. In some embodiments, the optimizer may employ a loss function, such as, e.g., Hinge Loss, Multi-class SVM Loss, Cross Entropy Loss, Negative Log Likelihood, or other suitable classification loss function to determine the error of the predicted label based on the known output.

In some embodiments, the known output may be obtained after the recommendation model produces the prediction, such as in online learning scenarios. In such a scenario, the recommendation model may receive the identifying information and generate the model output vector to produce a label classifying the identifying information. Subsequently, a user may provide feedback by, e.g., modifying, adjusting, removing, and/or verifying the label via a suitable feedback mechanism, such as a user interface device (e.g., keyboard, mouse, touch screen, user interface, or other interface mechanism of a user device or any suitable combination thereof). The feedback may be paired with the identifying information to form the training pair and the optimizer may determine an error of the predicted label using the feedback.

In some embodiments, based on the error, the optimizer may update the parameters of the recommendation model using a suitable training algorithm such as, e.g., backpropagation for a classifier machine learning model. In some embodiments, backpropagation may include any suitable minimization algorithm such as a gradient method of the loss function with respect to the weights of the classifier machine learning model. Examples of suitable gradient methods include, e.g., stochastic gradient descent, batch gradient descent, mini-batch gradient descent, or other suitable gradient descent technique. As a result, the optimizer may update the parameters of the recommendation model based on the error of predicted labels in order to train the recommendation model to model the correlation between identifying information and recommendations for characteristics and/or restrictions in order to produce more accurate labels of identifying information.

In some embodiments, the interrogation signal may carry all of the parameters of the requested bearer token, including the restrictions. In some embodiments, to reduce the power consumption of regularly and/or continually emitted an interrogation signal with all of the parameters of the requested bearer token, the user computing device 202 may emit an interrogation signal configured to initiate communication with the short range wireless card 201. Thus, upon receiving the interrogation signal, the RF radio 218 may automatically recognize the interrogation signal as an initiation for communication and return an acknowledgement to the RF radio 224. In sending the acknowledgement, the RF radio 224 may automatically determine that the short range wireless card 201 is within range and may generate and emit a second interrogation signal carrying the parameters for the requested bearer token to form the bearer token request.

In some embodiments, the RF radio 218 may receive the second interrogation signal and extract the parameters of the requested bearer token. In some embodiments, the RF chip 210 may initiate one or more sets of programming instructions (e.g., an application, applet, software package, application-specific integrated circuit instructions, etc.) that cause the circuitry of the RF chip 210 to instantiate the device authentication engine 216 to authenticate the user computing device 202 as being a permissioned to bear the bearer token 203.

In some embodiments, the device authentication engine 216 may be configured to authenticate the user computing device 202. Accordingly, the device authentication engine 216 may include authoritative data written to a memory thereof. The authoritative data defines the identity of permissions users, software and/or hardware for receiving bearer tokens. In some embodiments, the authoritative data may include, e.g., a public key, a permissioned device ID identifying a permissioned device, a permissioned application ID identifying permissioned software, a permissioned user ID and/or account ID identifying a permissioned user and/or account associated with a permissioned user, among other data or any combination thereof. In some embodiments, the device authentication engine 216 may compare the bearer token request to the authoritative data to determine an authorization of the user computing device 202. For example, the device authentication engine 216 may use a stored public key to authenticate a message authentication code (MAC) associated with the bearer token request and/or the interrogation signal. Alternatively, or in addition, the public key may be paired to a user password provided in the bearer token request such that the device authentication engine 216 may validate the user password based on the public key. Alternatively, or in addition, the device authentication engine 216 may verify that the device ID, application ID, user ID among other identifiers of the bearer token request match the authoritative data and/or an identifier associated with the private key 214.

In some embodiments, upon authenticating the user computing device 202 based on the bearer token request, the RF chip 210 may initiate one or more sets of programming instructions (e.g., an application, applet, software package, application-specific integrated circuit instructions, etc.) that cause the circuitry of the RF chip 210 to transmit a copy of the private key 214 to the user computing device 202 such that the user computing device 202 may use the private key to sign a bearer token 203.

In some embodiments, the RF radio 218 of the short range wireless card 201 may return the private key 214 to the user computing device 202 in a return signal in response to the interrogation signal. Thus, the private key 214 may be transmitted to the user computing device 202 to be received by the RF radio 224 to generate the bearer token 203 for later transmission during authentication. In some embodiments, the token store 222 may be a secure element of the RF chip 220, or may be a separate memory device such as a HSM, encrypted storage, secure coprocessor, or other memory device or any combination thereof.

In some embodiments, the RF chip 220 of the user computing device 202 may receive the private key 214 and automatically instantiate the cryptographic engine 226. In some embodiments, the cryptographic engine 226 may use the private key 214 and the parameters of the requested bearer token to generate a cryptographic token that forms the bearer token 203. In some embodiments, the cryptographic engine 226 may include circuitry configured to implement a hash function. In some embodiments, the hash function may include, e.g., MD5, RIPEMD-160, RTRO, SHA-1, SHA-2, Tiger (TTH), WHIRLPOOL, RNGs, block cipher algorithms (e.g., IDEA, RC2, RC5, CAST and Skipjack), Triple Data Encryption Standard (3DES), or other suitable hash function or any combination thereof. Thus, the inputs to the hash function may produce a unique output (e.g., numerical or alphanumerical output) that cannot be reversed to recreate the inputs (e.g., one-way). Accordingly, the output is dependent on the inputs and the private key 214. As such, restrictions on the bearer token 203 may be embedded in the bearer token 203 itself via the output of the hash function by making the output dependent on the parameters and/or restrictions of the bearer token request.

In some embodiments, the bearer token 203 may be made limited in time by embedding a time period defining validity of the bearer token 203. For example, a time keeping circuit of the cryptographic engine 226 may generate a time value associated with a current time. The cryptographic engine 226 may utilize the current time as a start to a window of time that defines the time period of validity. As such, the cryptographic engine 226 may define the window as the time period within which the current time occurs. For example, for preset time periods, such as, e.g., every 2 hours, 3 hours, 4 hours, 6 hours, 8 hours, 20 hours, 22 hours, 24 hours, or other period of time in a range of between 2 hour and 2 month, the preset time periods may be preset for each time period (e.g., for a two hour time period, 4:00 AM to 6:00 AM, followed by 6:00 AM to 8:00 AM, followed by 8:00 AM to 20:00 AM, etc. every day). Thus, the current time may be located within a particular preset time period. In some embodiments, to ensure validity of the time value and prevent spoofing or other manipulation, the device authentication engine 216 of the RF chip 210 may generate the time value and provide the time value to the user computing device 202 for use by the cryptographic engine 226. As a result, the short range wireless card 201 ensures that the time value is indicative of the time of the bearer token request.

In some embodiments, the window of time may be defined using the current time as a start time. Thus, the window of time may be a preset amount of time and/or an amount of time defined in the parameters of the bearer token request. The time period of the validity of the bearer token 203 may then become the window of time following the current time.

In some embodiments, whether using preset time periods or the window of time following the current time, the period of time of validity may be encoded into a particular time code (e.g., by algorithmic encoding, such as an indicia indicative of which time period, concatenating a value indicative of the current with a value indicative of the length of the window of time, with a value indicative of the day and/or date, among other time-related values, or by other encoding techniques). Thus, the time code may be used as an input to the hash function such that the window of time is embedded within the output. As a result, the output of the hash function cannot be recreated without using the same time code as input.

Similarly, in some embodiments, the geofencing restrictions, entity restrictions, and other restrictions may be embedded into the output of the hash function may encoding each restriction into a code (e.g., a geofence code, entity code, etc.).

In some embodiments, to prevent a replay attack, the cryptographic engine 226 may input a one-time code into the hash function. The one-time code may be a unique value that is synchronized with the access control device but that expires upon use or after a predetermined period of time so that attackers cannot intercept and reuse the bearer token 203. In some embodiments, the cryptographic engine 226 may generate the one-time code using, e.g., a time-based value, a random value, a counter, or other variable. For example, the time keeping circuit may generate the current time, which may be encoded and input as the one-time code. Alternatively, or in addition, a random number generator circuit, a PRNG circuit, a CPRNG circuit, or other circuit may generate a random value for use as the one-time code.

In some embodiments, the cryptographic engine 226 may restrict the bearer token 203 to use by the user computing device 202 by using the device ID and/or application ID associated with the user computing device 202 as an input to the hash function. In some embodiments, the user computing device 202 may be configured, via an access requesting or bearer token communication application, to provide to the access control device 230 the device ID and/or the application ID alongside the bearer token 203. Alternatively, or in addition, the access control device 230 may be configured to only validate the bearer token 203 if the user computing device 202 provides the device ID and/or application ID, whether alongside the bearer token 203 or separately. Thus, the device ID and/or the application ID may be used as an input to the hash function such that the output of the hash function is only reproducible when the bearer token 203 is provided by the user computing device 202.

In some embodiments, the cryptographic engine 226 may use the hash function to produce the output based on the private key 214 and the inputs including, e.g., the time value, the one-time code, the device ID, the application ID, the geofence, the location, the user account ID, the user ID, or other input or any combination thereof. As a result, the hash function may produce a cryptographic code that forms the bearer token 203. In some embodiments, the cryptographic code may be the bearer token 203, or may be modified or otherwise processed to derive the bearer token 203. For example, the cryptographic engine 226 may format the cryptographic code (e.g., as a value, string, etc.), separate portions of the cryptographic code to create multiple code segments according to a predetermined logic for segmenting the cryptographic code, trim beginning and/or ending characters in the cryptographic code to form a trimmed code, or other processing of the cryptographic code or any combination thereof to derive the bearer token 203.

Accordingly, in some embodiments, the system may include using the chip on a card 201 to generate a bearer token 203 that can be used for authentication for a set period of time. The system allows a user to tap a card 201 to their user computing device 202 (e.g., a mobile device) and generate a token that is tied to the specific mobile device with a specified time duration. The generated token can be used to authenticate until it expires, so the user will not need to enter credentials after the token is generated.

In some embodiments, this system incorporates multiple security features to create a secure token. For example, one or more applets with a card-provided private key 214 that is used to sign a token. Because the key 214 exists only within the secure element of the card 201 and token signing happens upon a secure communication with the card 201 to access the private key 214, the private key 214 may be kept secure. Using both a mobile device and the card as part of token generation serves as an enhanced form of authentication proving the user is both in possession of the mobile device and physical credit card. An expiration date is included in the token to ensure it has a limited lifespan.

In some embodiments, once this token is generated it can be used as a source of authentication until it expires, so users will not be required to authenticate again during the token's lifespan. Because of the security mechanism around this process it serves as a form of two factor authentication. When the token expires, the user can renew the token by tapping the credit card to the mobile again to generate a new token.

In some embodiments, the token signing can be done with public/private key, or with shared symmetric key operations. The distinction between this and other authentication standards is that it would be optimized for processing by payment security equipment (HSMs). Using derived and session keys may allow a backend to recreate the keys to validate the token without undue key management resource demands.

In some embodiments, the access control device 230 may be configured to authenticate the user based on the bearer token 203. The access control device 230 may be associated with one or more restricted objects, spaces, services, data, events, or other things for which access by users may be controlled or any combination thereof. For example, the access control device 230 may be associated with a locker that is configured to actuate a lock to unlock the locker upon validation of the bearer token 203 so as to allow the user to access contents of the locker. In another example, the access control device 230 may be associated with a ticketed event and/or location (e.g., flight, concert, movie, play, performance, gallery, studio, workspace, hotel, etc.) such that upon validation of the bearer token 203, the access control device 230 may instruct a display to present the validation to allow entry and/or actuate a gating mechanism (e.g., a turnstile, door lock, or other gating mechanism or combination thereof) to allow access based on the validation. In another example, the access control device 230 may be a computing device having software that is configured to restrict access to one or more files, documents, data objects, software services or other data or combination thereof until validation of the bearer token 203.

Thus, in some embodiments, to access the restricted objects, spaces, services, data, events, etc., the user may present the user computing device 202 such that the RF radio 224 is brought into range of the RF radio 238 of the access control device 230. Similar to initiating communications with the short range wireless card 201, an interrogation signal may be emitted periodically and/or continuously by the RF radio 224, by the RF radio 238, or both. The interrogation signal may commence an exchange of communications between the access control device 230 and the RF chip 220. For example, the RF radio 238 may send a request for authenticating information to the RF radio 224, which the RF radio 224 may be configured to automatically respond to with the bearer token 203. Alternatively, or in addition, the RF radio 224 may emit an access request carrying the bearer token 203 and requesting access via the access control device 230 based on authentication of the bearer token 203. In some embodiments, other sequences of communications resulting in the bearer token 203 being transmitted to the access control device 230 are contemplated.

In some embodiments, the RF radio 238 may receive the bearer token 203 and automatically implement a token authentication engine 236 and a cryptographic engine 232. In some embodiments, the token authentication engine 236 and/or the cryptographic engine 232 may each include circuitry integrated on-chip with the RF radio 238, as a separate processing component (e.g., a coprocessor or processor), or a combination thereof. In some embodiments, the access control device 230, the RF radio 238, the authentication engine 236 and/or the cryptographic engine 232 or any combination thereof may include or be incorporated into a passive device or active device, or any combination thereof.

In some embodiments, the authentication engine 236 may compare the bearer token 203 to a locally generated authentication token. The locally generated authentication token may include authoritative authentication data that is used to determine whether the bearer token 203 is valid, e.g., whether the bearer token 203 represents valid data for, e.g., time, location, device, software, user, etc. Thus, the authentication data may correspond to the inputs of the hash function implemented by the cryptographic engine 226 and be signed with a key corresponding to the private key 214 of the short range wireless card 201.

Accordingly, in some embodiments, the authentication engine 236 may utilize the output of the cryptographic engine 226. The cryptographic engine 226 may include circuitry configured to generate an output based on the authoritative data and a public key 234 such that where the authoritative data matches the inputs for the bearer token 203 and the public key 234 corresponds to the private key 214, the authentication token and the bearer token 203 match. Thus, as detailed above, the access control device 230 may be configured to request, and/or the user computing device 202 may be configured to provide, in the access request one or more identifiers including, e.g., the device ID, application ID, user ID, user account ID, or other identifier or combination thereof, a location, a time associated with transmission of the access request, or other information or any combination thereof. Alternatively, or additionally, the access control device 230 may utilize local information, such as, e.g., a locally generated current time generated by a time keeping circuit, a random number generated by a random number generator or PRNG or CPRNG or other generator, a locally stored and/or determined location (e.g., via GPS or other location determination mechanism), or other locally provided information or any combination thereof. Thus, in some embodiments, the location and time, among other parameters, at the time and place of the access request may be used to test the bearer token 203 for authentication and access permissions.

To do so, in some embodiments, similar to the cryptographic engine 226 detailed above, the cryptographic engine 232 may access the public key 234. The public key 234 may be stored in a secure element of the access control device, such as, e.g., an HSM, an encrypted storage, secure coprocessor, or other memory device or any combination thereof. In some embodiments, the public key 234 may be generated by an authentication server in communication with the user computing device 202 and/or the access control device 230, e.g., via a network. The authentication server may disseminate and/or publish the public key to a particular access control device 230 associated with the request, e.g., based on communication with the user computing device 202, and/or to all access control devices 230 in a network of access control devices 230. Thus, the access control device 230 may download the public key 234 from the authentication server that maintains authoritative public keys associated with each user and/or user account, and thus may maintain a public key associated with the short range wireless card 201 and/or the private key 214. In some embodiments, therefore, the private key 214 is used to sign the bearer token 203 and the public key 234 is used to verify the signature. In some embodiments, the distribution of keys may be reversed, where the public key 234 associated with the access control device 230 is loaded onto the short range wireless card 201 to enable the user computing device 202, upon receipt of the private key 214 from the short range wireless card 201, to encrypt the bearer token 203 for decryption by the access control device 230, e.g., using a private key held by the access control device 230. In some embodiments, this arrangement is referred to as public key encryption or asymmetric cryptography. Other types of cryptographic may be implemented, such as symmetric key cryptographic where the access control device 230 and the short range wireless card 201 share the same secret key. In symmetric key cryptography, the authentication server may provide, via a secure communication channel, a copy of the private key 214 to the access control device 230. Such an arrangement, however, may have increased risks of security attacks due to the private key 214 being exchanged with an additional device.

In some embodiments, the cryptographic engine 232 may determine a time period associated with the access request based on the current time. In some embodiments, the time period may be determined based on the same preset time period structure implemented to determine the time period of the bearer token 203 to ensure consistency. As a result, if the time period calculated by the cryptographic engine 232 is calculated in the same way as the time period of the bearer token 203, the if the current time of the access request matches the current time of the bearer token 203, then the bearer token 203 and the access request apply to the same time period resulting in matching inputs to the hash function at both the cryptographic engine 226 and the cryptographic engine 232.

Similarly, location may be mapped to predetermined regions (e.g., towns, zip codes, cities, states, geographic regions, cartographic regions, longitude-latitude ranges, etc.). Thus, where the location of the access request is mapped to a matching region as the location of the bearer token 203, then the inputs to the hash function at both the cryptographic engine 226 and the cryptographic engine 232 may match.

In some embodiments, the cryptographic engine 232 may use the hash function to produce an output based on the public key 234 and the inputs including, e.g., the time period, a one-time code, the device ID, the application ID, the user ID, the user account ID, the location region, or other input or any combination thereof. As a result, the hash function may produce a cryptographic code that forms the authentication token. In some embodiments, the cryptographic code may be the authentication token, or may be modified or otherwise processed to derive the authentication token. For example, the cryptographic engine 232 may format the cryptographic code (e.g., as a value, string, etc.), separate portions of the cryptographic code to create multiple code segments according to a predetermined logic for segmenting the cryptographic code, trim beginning and/or ending characters in the cryptographic code to form a trimmed code, or other processing of the cryptographic code or any combination thereof to derive the authentication token.

In some embodiments, where the inputs to the hash function at both the cryptographic engine 226 and the cryptographic engine 232 match, both the cryptographic engine 226 and the cryptographic engine 232 use a common hash function, the public key 234 corresponds to the private key 214, and common post-processing steps to derive a cryptographic token are taken, then the authentication token produced by the cryptographic engine 232 may match the bearer token 203. Accordingly, the authentication engine 236 may compare the authentication token to the bearer token 203. Where the bearer token 203 matches the authentication token, the private key 214 and the inputs used to derive the bearer token 203 are valid, including, e.g., the time period, the location, the user ID, the device ID, the user account ID, the one-time code, or other input or any combination thereof. As a result, the authentication engine 236 may validate the bearer token 203 to authorize access by the user (e.g., enable access to data and/or software services, actuate a lock or gating mechanism, present access authorization to personnel controlling access, or any combination thereof). Thus, the bearer token 203 may provide strong cryptographic authentication of the user and other restrictions for securely controlled access.

Figure 3:
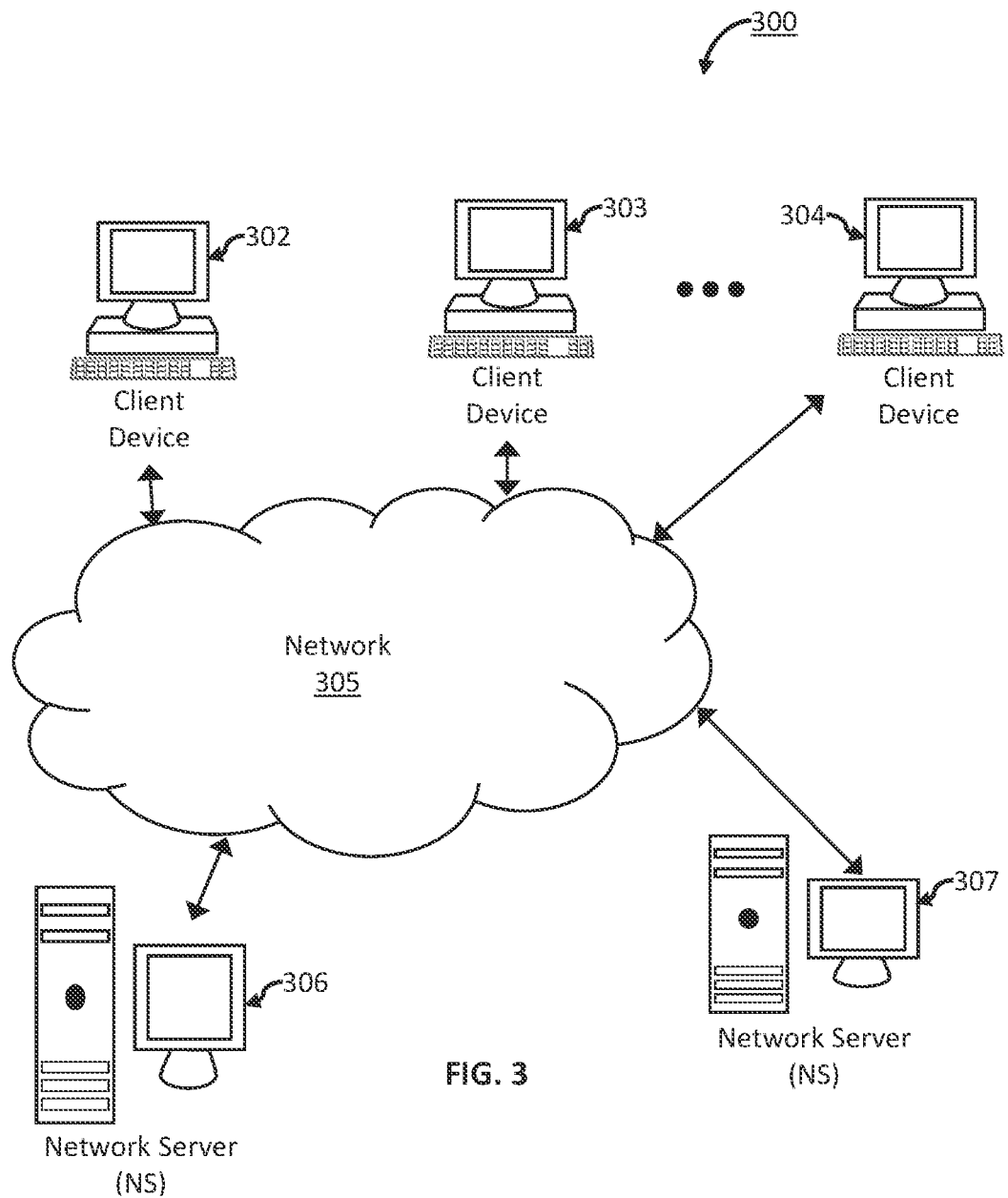
FIG. 3 depicts a block diagram of an exemplary computer-based system and platform for short-range communication-based authentication in accordance with one or more embodiments of the present disclosure.

FIG. 3 depicts a block diagram of an exemplary computer-based system and platform 300 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 300 may be configured to manage a large number of members and concurrent transactions, as detailed herein. In some embodiments, the exemplary computer-based system and platform 300 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 3, client device 302, client device 303 through client device 304 (e.g., clients) of the exemplary computer-based system and platform 300 may include virtually any computing device capable of receiving and sending a message over a network (e.g., cloud network), such as network 305, to and from another computing device, such as servers 306 and 307, each other, and the like. In some embodiments, the client devices 302 through 304 may be personal computers, multiprocessor systems, microprocessor-based or programmable consumer electronics, network PCs, and the like. In some embodiments, one or more client devices within client devices 302 through 304 may include computing devices that typically connect using a wireless communications medium such as cell phones, smart phones, pagers, walkie talkies, radio frequency (RF) devices, infrared (IR) devices, CBs citizens band radio, integrated devices combining one or more of the preceding devices, or virtually any mobile computing device, and the like. In some embodiments, one or more client devices within client devices 302 through 304 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more client devices within client devices 302 through 304 may run one or more applications, such as Internet browsers, mobile applications, voice calls, video games, videoconferencing, and email, among others. In some embodiments, one or more client devices within client devices 302 through 304 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device within client devices 302 through 304 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a client device may periodically report status or send alerts over text or email. In some embodiments, a client device may contain a data recorder which is remotely downloadable by the user using network protocols such as FTP, SSH, or other file transfer mechanisms. In some embodiments, a client device may provide several levels of user interface, for example, advanced user, standard user. In some embodiments, one or more client devices within client devices 302 through 304 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 305 may provide network access, data transport and/or other services to any computing device coupled to it. In some embodiments, the exemplary network 305 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 305 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 305 may include and implement, as an alternative or in conjunction with one or more of the above, a WiMAX architecture defined by the WiMAX forum. In some embodiments and, optionally, in combination of any embodiment described above or below, the exemplary network 305 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 305 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 305 may also include mass storage, such as network attached storage (NAS), a storage area network (SAN), a content delivery network (CDN) or other forms of computer or machine readable media.

In some embodiments, the exemplary server 306 or the exemplary server 307 may be a web server (or a series of servers) running a network operating system, examples of which may include but are not limited to Apache on Linux or Microsoft IIS (Internet Information Services). In some embodiments, the exemplary server 306 or the exemplary server 307 may be used for and/or provide cloud and/or network computing. Although not shown in FIG. 3, in some embodiments, the exemplary server 306 or the exemplary server 307 may have connections to external systems like email, SMS messaging, text messaging, ad content providers, etc. Any of the features of the exemplary server 306 may be also implemented in the exemplary server 307 and vice versa.

In some embodiments, one or more of the exemplary servers 306 and 307 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the client devices 301 through 304.

In some embodiments and, optionally, in combination of any embodiment described above or below, for example, one or more exemplary computing client devices 302 through 304, the exemplary server 306, and/or the exemplary server 307 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 4:
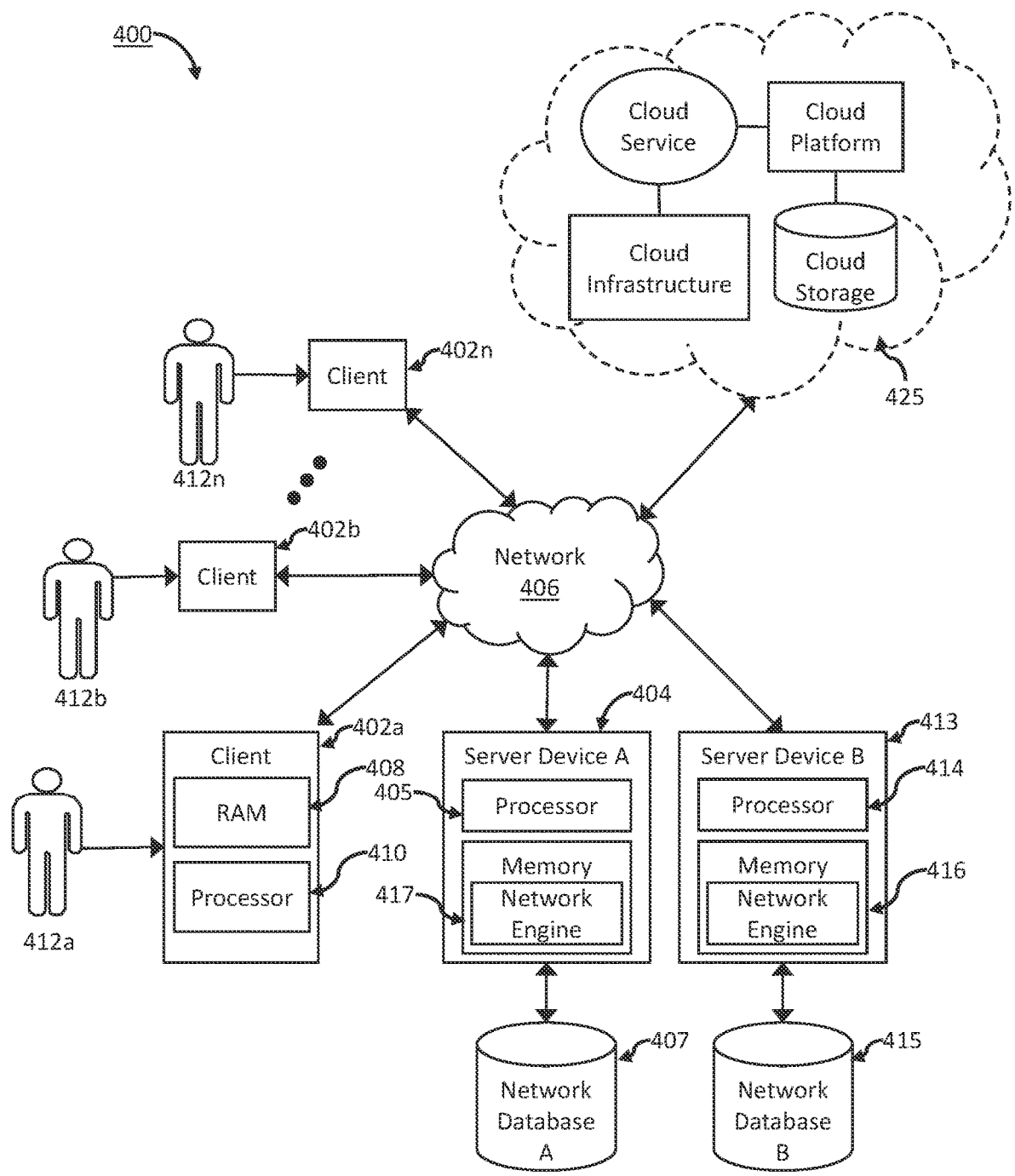
FIG. 4 depicts a block diagram of another exemplary computer-based system and platform for short-range communication-based authentication in accordance with one or more embodiments of the present disclosure.

FIG. 4 depicts a block diagram of another exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client device 402a, client device 402b through client device 402n shown each at least includes a computer-readable medium, such as a random-access memory (RAM) 408 coupled to a processor 410 or FLASH memory. In some embodiments, the processor 410 may execute computer-executable program instructions stored in memory 408. In some embodiments, the processor 410 may include a microprocessor, an ASIC, and/or a state machine. In some embodiments, the processor 410 may include, or may be in communication with, media, for example computer-readable media, which stores instructions that, when executed by the processor 410, may cause the processor 410 to perform one or more steps described herein. In some embodiments, examples of computer-readable media may include, but are not limited to, an electronic, optical, magnetic, or other storage or transmission device capable of providing a processor, such as the processor 410 of client device 402a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, client devices 402a through 402n may also comprise a number of external or internal devices such as a mouse, a CD-ROM, DVD, a physical or virtual keyboard, a display, or other input or output devices. In some embodiments, examples of client devices 402a through 402n (e.g., clients) may be any type of processor-based platforms that are connected to a network 406 such as, without limitation, personal computers, digital assistants, personal digital assistants, smart phones, pagers, digital tablets, laptop computers, Internet appliances, and other processor-based devices. In some embodiments, client devices 402a through 402n may be specifically programmed with one or more application programs in accordance with one or more principles/methodologies detailed herein. In some embodiments, client devices 402a through 402n may operate on any operating system capable of supporting a browser or browser-enabled application, such as Microsoft™, Windows™, and/or Linux. In some embodiments, client devices 402a through 402n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 402a through 402n, user 412a, user 412b through user 412n, may communicate over the exemplary network 406 with each other and/or with other systems and/or devices coupled to the network 406. As shown in FIG. 4, exemplary server devices 404 and 413 may include processor 405 and processor 414, respectively, as well as memory 417 and memory 416, respectively. In some embodiments, the server devices 404 and 413 may be also coupled to the network 406. In some embodiments, one or more client devices 402a through 402n may be mobile clients.

In some embodiments, at least one database of exemplary databases 407 and 415 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 5:
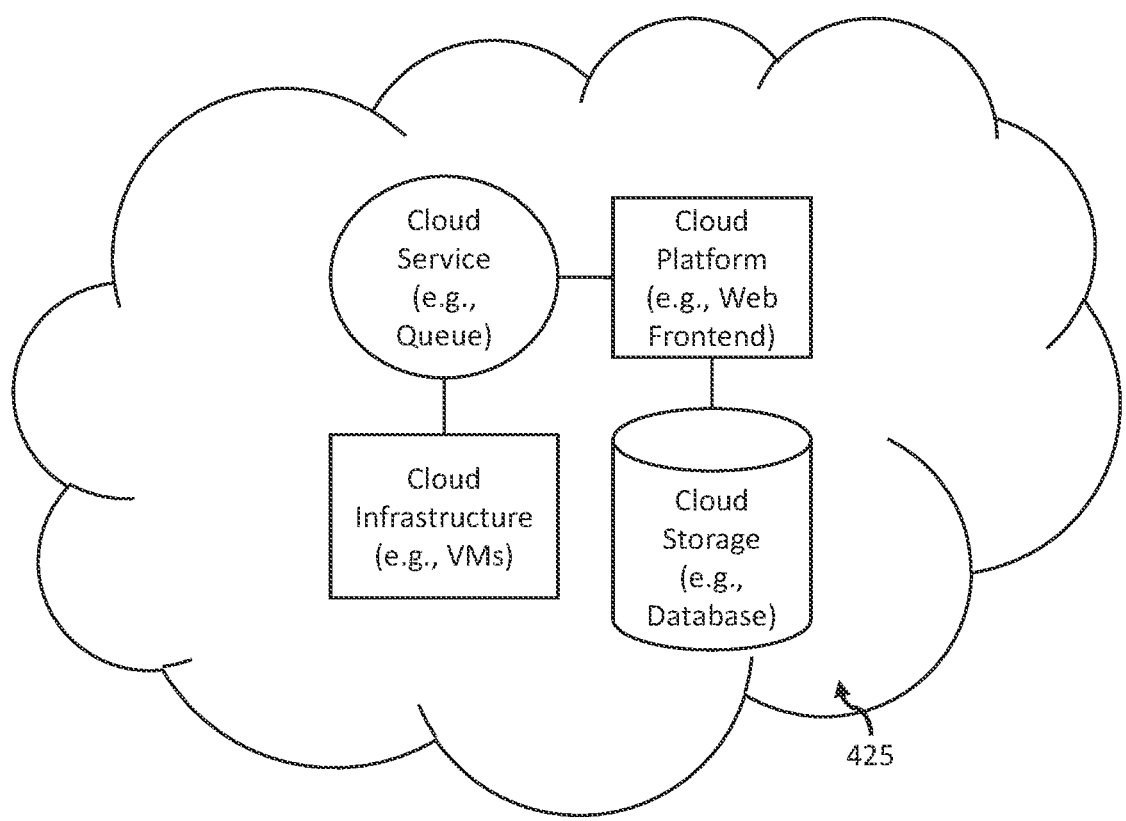
FIG. 5 depicts illustrative schematics of an exemplary implementation of the cloud computing/architecture(s) in which embodiments of a system for short-range communication-based authentication may be specifically configured to operate in accordance with some embodiments of the present disclosure.
Figure 6:
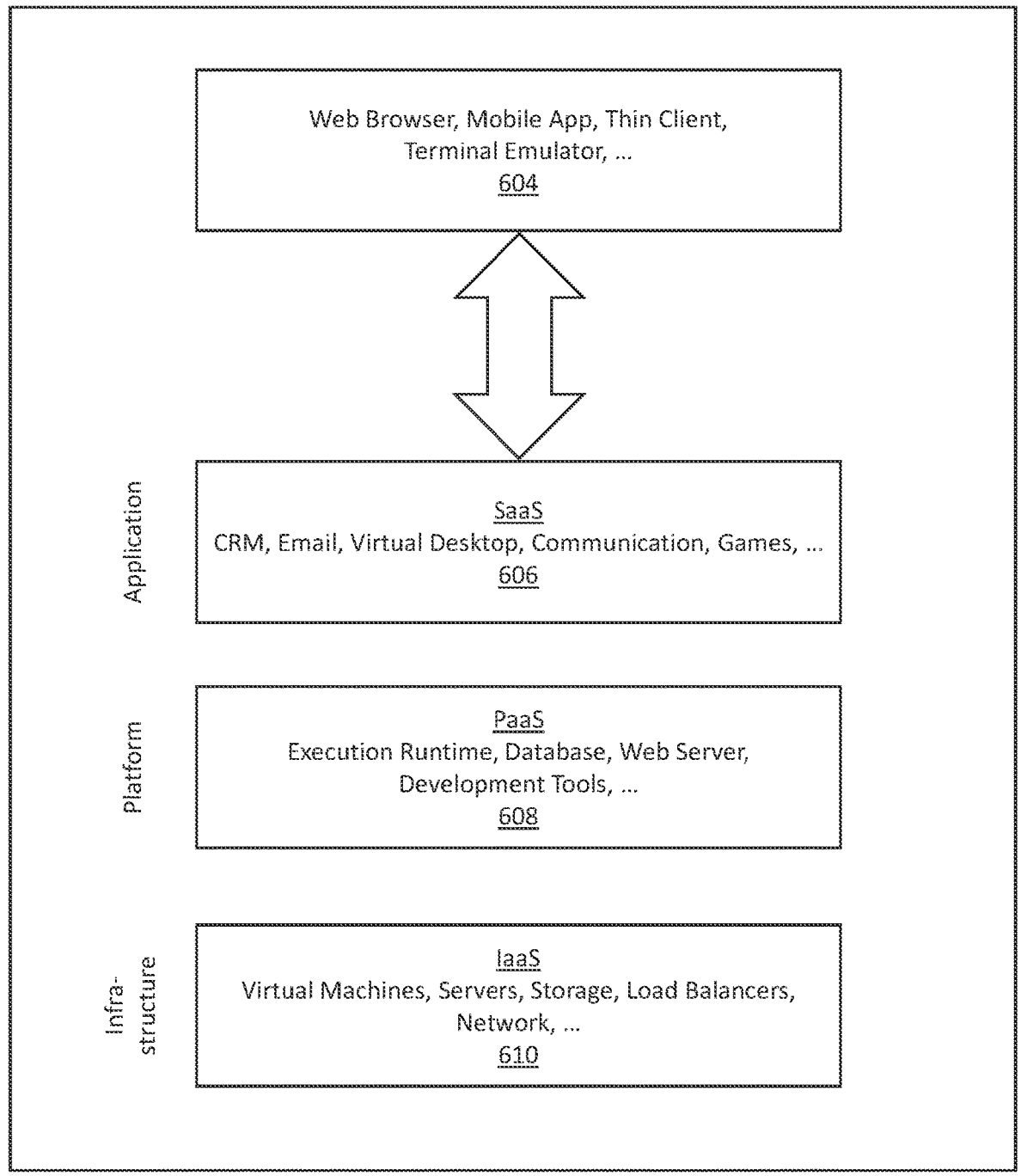
FIG. 6 depicts illustrative schematics of another exemplary implementation of the cloud computing/architecture(s) in which embodiments of a system for short-range communication-based authentication may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 425 such as, but not limiting to: infrastructure a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

Figure 7:
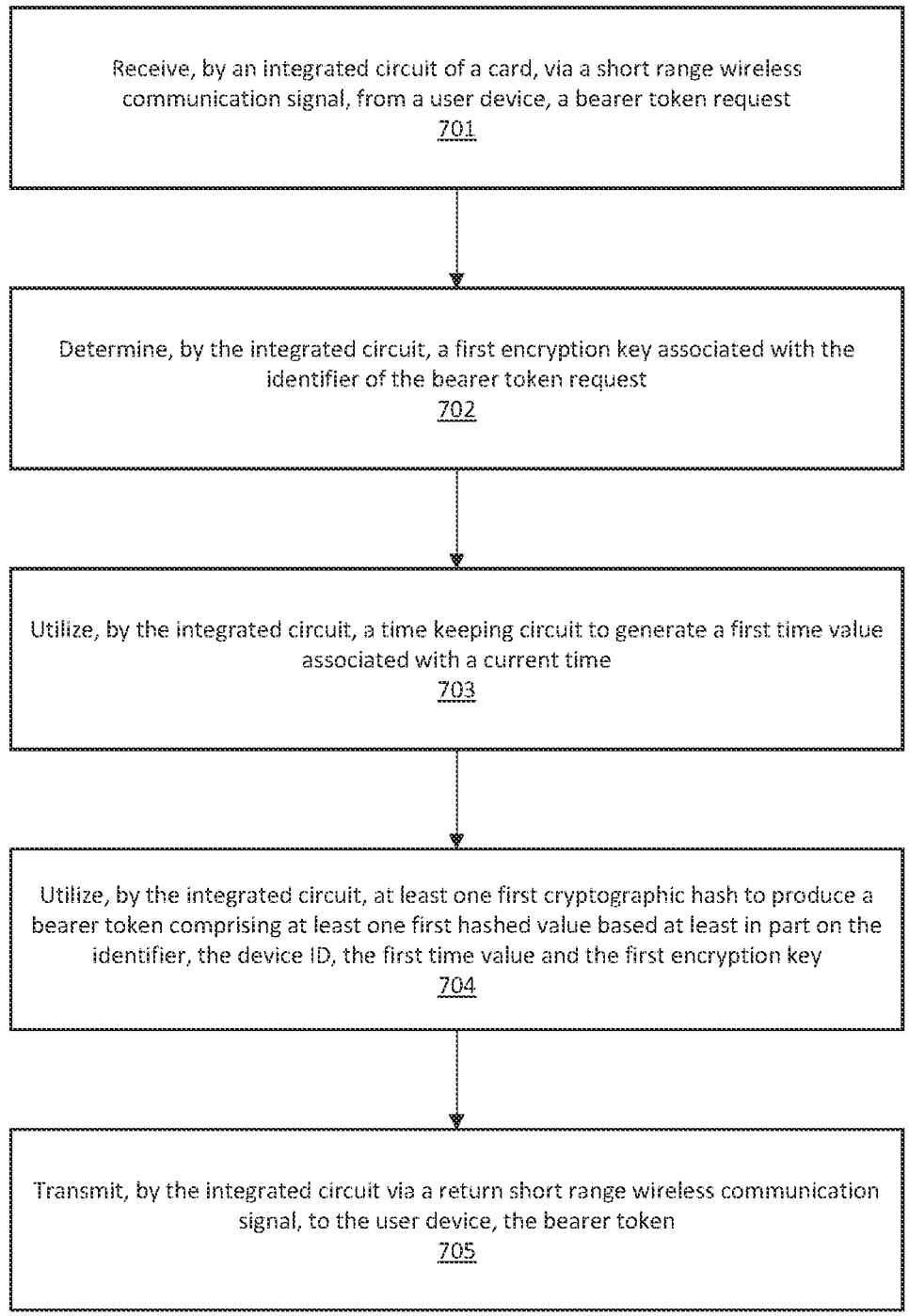
FIG. 7 depicts an exemplary flowchart for a method of short-range communication-based authentication in accordance with one or more embodiments of the present disclosure.

Referring now to FIG. 7, an exemplary flowchart for a method of short-range communication-based authentication is depicted in accordance with one or more embodiments of the present disclosure. In some embodiments, the method provides a card used to create a bearer token on a mobile device using a short range wireless communication (e.g., NFC, RFID, Bluetooth, or other) between the chip and the mobile device. An applet of the chip on the card uses an internal private key to sign a token when the mobile device requests the token. The token may then be used as a form of authentication at an access control device.

In some embodiments, the method includes, at step 701, receiving, by an integrated circuit of a card, via a short range wireless communication signal, from a user device, a bearer token request including: an identifier that identifies a user associated with the user device and a device ID that identifies the user device.

In some embodiments, the method includes, at step 702, determining, by the integrated circuit, a first cryptographic key associated with the identifier of the bearer token request.

In some embodiments, the method includes, at step 703, utilizing, by the integrated circuit, a time keeping circuit to generate a first time value associated with a current time. In some embodiments, the first time value is representative of a window of time starting at the current time so as to be valid throughout the window of time and to expire upon an end of the window of time from the current time. In some embodiments, the method includes, at step 704, utilizing, by the integrated circuit, at least one first cryptographic hash to produce a bearer token including at least one first hashed value based at least in part on the identifier, the device ID, the first time value and the first cryptographic key.

In some embodiments, the method includes, at step 705, transmitting, by the integrated circuit via a return short range wireless communication signal, to the user device, the bearer token. In some embodiments, the bearer token is configured to authenticate the user of the user device upon the bearer token being equivalent to a comparison token. In some embodiments, the comparison token includes at least one second hashed value produced by at least one second cryptographic hash based at least in part on the identifier, the device ID, a second time value and a second cryptographic key. In some embodiments, the second cryptographic key is associated with the first cryptographic key. In some embodiments, the comparison token is equivalent to the bearer token when the second time value is representative of the time window.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of a software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method including: receiving, by an integrated circuit of a short range wireless card, via a short range wireless signal, from a user device, a bearer token request including an identifier that identifies: a user associated with the user device and a device ID that identifies the user device; determining, by the integrated circuit of the short range wireless card, a first cryptographic key associated with the identifier of the bearer token request; utilizing, by the integrated circuit of the short range wireless card, a time keeping circuit to generate a first time value associated with a current time; where the first time value is representative of a window of time starting at the current time so as to be valid throughout the window of time and to become expired upon an end of the window of time from the current time; utilizing, by the integrated circuit of the short range wireless card, at least one first cryptographic hash to produce a bearer token including at least one first hashed value based at least in part on: the identifier, the device ID, the first time value and the first cryptographic key; transmitting, by the integrated circuit of the short range wireless card and via a return short range wireless signal, to the user device, the bearer token; where the bearer token is configured to authenticate the user of the user device upon the bearer token being equivalent to a comparison token; where the comparison token includes at least one second hashed value produced by at least one second cryptographic hash based at least in part on: the identifier, the device ID, a second time value and a second cryptographic key; where the second cryptographic key is associated with the first cryptographic key; and where the comparison token is equivalent to the bearer token when the second time value is representative of the time window.

Clause 2. The method as recited in clause 1, where the short range wireless signal includes a Near-Field Communication (NFC) signal.

Clause 3. The method as recited in clause 1, where the authentication of the bearer token causes an access control device to actuate a locking mechanism to unlock a door so as to allow access by the user.

Clause 4. The method as recited in clause 1, further including: storing, by the integrated circuit of the short range wireless card, the bearer token in a cache; receiving, by the integrated circuit of the short range wireless card, a second bearer token request within the window of time; and transmitting, by the integrated circuit of the short range wireless card and via a second return short range wireless signal, the bearer token to the user device.

Clause 5. The method as recited in clause 1, where the first key includes a private key associated with the integrated circuit of the short range wireless card, and the second cryptographic key includes a public key associated with the integrated circuit of the short range wireless card.

Clause 6. The method as recited in clause 1, where the first cryptographic key includes a public key associated with an access control device; where the access control device is configured to restrict access until authentication of the bearer token; and where the second cryptographic key includes a private key associated with the access control device and held by the access control device.

Clause 7. The method as recited in clause 1, where the second cryptographic key is published to a network of access control devices as a public key; and where each access control device is configured to restrict access until authentication of the bearer token based on the public key.

Clause 8. The method as recited in clause 1, where the bearer token request further includes at least one restriction associated with authentication of the bearer token; where the at least one restriction includes at least one of: a geographic area associated with authentication of the bearer token, a device identifier (ID) associated with a device for which the bearer token is authenticated, a user ID associated with the user for which the bearer token is authenticated, or an entity ID associated with an entity associated with the authentication of the bearer token.

Clause 9. The method as recited in clause 8, further including: utilizing, by the integrated circuit of the short range wireless card, the at least one first cryptographic hash to produce the bearer token including the at least one first hashed value based at least in part on the at least one restriction so as to restrict authentication of the bearer token to the at least one restriction.

Clause 10. The method as recited in clause 1, where the short range wireless card is a smart credit card.

Clause 11. A system including: a short range wireless card, including: an integrated circuit, where the integrated circuit is configured to: receive via a short range wireless signal, from a user device, a bearer token request including: an identifier that identifies a user associated with the user device and a device ID that identifies the user device; determine a first cryptographic key associated with the identifier of the bearer token request; utilize a time keeping circuit to generate a first time value associated with a current time; where the first time value is representative of a window of time starting at the current time so as to be valid throughout the window of time and to become expired upon an end of the window of time from the current time; utilize at least one first cryptographic hash to produce a bearer token including at least one first hashed value based at least in part on the identifier, the device ID, the first time value and the first cryptographic key; transmit via a return short range wireless signal, to the user device, the bearer token; where the bearer token is configured to authenticate the user of the user device upon the bearer token being equivalent to a comparison token; where the comparison token includes at least one second hashed value produced by at least one second cryptographic hash based at least in part on the identifier, the device ID, a second time value and a second cryptographic key; where the second cryptographic key is associated with the first cryptographic key; and where the comparison token is equivalent to the bearer token when the second time value is representative of the time window.

Clause 12. The system as recited in clause 11, where the short range wireless signal includes a Near-Field Communication (NFC) signal.

Clause 13. The system as recited in clause 11, where the authentication of the bearer token causes an access control device to actuate a locking mechanism to unlock a door so as to allow access by the user.

Clause 14. The system as recited in clause 11, where the integrated circuit is further configured to: store the bearer token in a cache; receive a second bearer token request within the window of time; and transmit via a second return short range wireless signal, the bearer token to the user device.

Clause 15. The system as recited in clause 11, where the first key includes a private key associated with the integrated circuit, and the second cryptographic key includes a public key associated with the integrated circuit.

Clause 16. The system as recited in clause 11, where the first cryptographic key includes a public key associated with an access control device; where the access control device is configured to restrict access until authentication of the bearer token; and where the second cryptographic key includes a private key associated with the access control device and held by the access control device.

Clause 17. The system as recited in clause 11, where the second cryptographic key is published to a network of access control devices as a public key; and where each access control device is configured to restrict access until authentication of the bearer token based on the public key.

Clause 18. The system as recited in clause 11, where the bearer token request further includes at least one restriction associated with authentication of the bearer token; where the at least one restriction includes at least one of: a geographic area associated with authentication of the bearer token, a device identifier (ID) associated with a device for which the bearer token is authenticated, a user ID associated with the user for which the bearer token is authenticated, or an entity ID associated with an entity associated with the authentication of the bearer token.

Clause 19. The system as recited in clause 18, where the integrated circuit is further configured to: utilize the at least one first cryptographic hash to produce the bearer token including the at least one first hashed value based at least in part on the at least one restriction so as to restrict authentication of the bearer token to the at least one restriction.

Clause 20. The system as recited in clause 11, where the short range wireless card is a smart credit card.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:
1. A method comprising:
receiving, by an integrated circuit of a short range wireless card, via a short range wireless signal, from a user device, a bearer token request comprising an identifier that identifies:
a user associated with the user device and
a device ID that identifies the user device;
determining, by the integrated circuit of the short range wireless card, a first cryptographic key associated with the identifier of the bearer token request;
utilizing, by the integrated circuit of the short range wireless card, a time keeping circuit to generate a first time value associated with a current time;
wherein the first time value is representative of a window of time starting at the current time so as to be valid throughout the window of time and to become expired upon an end of the window of time from the current time;
utilizing, by the integrated circuit of the short range wireless card, at least one first cryptographic hash to produce a bearer token comprising at least one first hashed value based at least in part on:
the identifier,
the device ID,
the first time value and
the first cryptographic key;
transmitting, by the integrated circuit of the short range wireless card and via a return short range wireless signal, to the user device, the bearer token;
wherein the bearer token is configured to authenticate the user of the user device upon the bearer token being equivalent to a comparison token;
wherein the authentication of the bearer token causes an access control device to actuate a locking mechanism to unlock a door so as to allow access by the user;
wherein the comparison token comprises at least one second hashed value produced by at least one second cryptographic hash based at least in part on:
the identifier,
the device ID,
a second time value and
a second cryptographic key;
wherein the second cryptographic key is associated with the first cryptographic key;
wherein the first key comprises a private key associated with the integrated circuit of the short range wireless card, and the second cryptographic key comprises a public key associated with the integrated circuit of the short range wireless card; and
wherein the comparison token is equivalent to the bearer token when the second time value is representative of the time window.

2. The method as recited in claim 1, wherein the short range wireless signal comprises a Near-Field Communication (NFC) signal.

3. The method as recited in claim 1, further comprising:
storing, by the integrated circuit of the short range wireless card, the bearer token in a cache;
receiving, by the integrated circuit of the short range wireless card, a second bearer token request within the window of time; and
transmitting, by the integrated circuit of the short range wireless card and via a second return short range wireless signal, the bearer token to the user device.

4. The method as recited in claim 1, wherein the first cryptographic key comprises a public key associated with an access control device;
wherein the access control device is configured to restrict access until authentication of the bearer token; and
wherein the second cryptographic key comprises a private key associated with the access control device and held by the access control device.

5. The method as recited in claim 1, wherein the second cryptographic key is published to a network of access control devices as a public key; and
wherein each access control device is configured to restrict access until authentication of the bearer token based on the public key.

6. The method as recited in claim 1, wherein the bearer token request further comprises at least one restriction associated with authentication of the bearer token;
wherein the at least one restriction comprises at least one of:
a geographic area associated with authentication of the bearer token,
a device identifier (ID) associated with a device for which the bearer token is authenticated,
a user ID associated with the user for which the bearer token is authenticated, or
an entity ID associated with an entity associated with the authentication of the bearer token.

7. The method as recited in claim 6, further comprising:
utilizing, by the integrated circuit of the short range wireless card, the at least one first cryptographic hash to produce the bearer token comprising the at least one first hashed value based at least in part on the at least one restriction so as to restrict authentication of the bearer token to the at least one restriction.

8. The method as recited in claim 1, wherein the of the short range wireless card is a smart credit card.

9. A system comprising:
a short range wireless card, comprising:
an integrated circuit, wherein the integrated circuit is configured to:
receive via a short range wireless signal, from a user device, a bearer token request comprising:
an identifier that identifies a user associated with the user device and
a device ID that identifies the user device;
determine a first cryptographic key associated with the identifier of the bearer token request;
utilize a time keeping circuit to generate a first time value associated with a current time;
wherein the first time value is representative of a window of time starting at the current time so as to be valid throughout the window of time and to become expired upon an end of the window of time from the current time;
utilize at least one first cryptographic hash to produce a bearer token comprising at least one first hashed value based at least in part on the identifier, the device ID, the first time value and the first cryptographic key;
transmit via a return short range wireless signal, to the user device, the bearer token;
wherein the bearer token is configured to authenticate the user of the user device upon the bearer token being equivalent to a comparison token;
wherein the authentication of the bearer token causes an access control device to actuate a locking mechanism to unlock a door so as to allow access by the user;
wherein the comparison token comprises at least one second hashed value produced by at least one second cryptographic hash based at least in part on the identifier, the device ID, a second time value and a second cryptographic key;
wherein the second cryptographic key is associated with the first cryptographic key;
wherein the first key comprises a private key associated with the integrated circuit of the short range wireless card, and the second cryptographic key comprises a public key associated with the integrated circuit of the short range wireless card; and
wherein the comparison token is equivalent to the bearer token when the second time value is representative of the time window.

10. The system as recited in claim 9, wherein the short range wireless signal comprises a Near-Field Communication (NFC) signal.

11. The system as recited in claim 9, wherein the integrated circuit is further configured to:
store the bearer token in a cache;
receive a second bearer token request within the window of time; and
transmit via a second return short range wireless signal, the bearer token to the user device.

12. The system as recited in claim 9, wherein the first cryptographic key comprises a public key associated with an access control device;
wherein the access control device is configured to restrict access until authentication of the bearer token; and
wherein the second cryptographic key comprises a private key associated with the access control device and held by the access control device.

13. The system as recited in claim 9, wherein the second cryptographic key is published to a network of access control devices as a public key; and
wherein each access control device is configured to restrict access until authentication of the bearer token based on the public key.

14. The system as recited in claim 9, wherein the bearer token request further comprises at least one restriction associated with authentication of the bearer token;
wherein the at least one restriction comprises at least one of:
a geographic area associated with authentication of the bearer token,
a device identifier (ID) associated with a device for which the bearer token is authenticated,
a user ID associated with the user for which the bearer token is authenticated, or
an entity ID associated with an entity associated with the authentication of the bearer token.

15. The system as recited in claim 14, wherein the integrated circuit is further configured to:
utilize the at least one first cryptographic hash to produce the bearer token comprising the at least one first hashed value based at least in part on the at least one restriction so as to restrict authentication of the bearer token to the at least one restriction.

16. The system as recited in claim 9, wherein the short range wireless card is a smart credit card.

* * * * *